(12) United States Patent
Barbet et al.

(10) Patent No.: US 11,179,633 B2
(45) Date of Patent: Nov. 23, 2021

(54) SKETCHING ROUTINE FOR VIDEO GAMES

(71) Applicant: Square Enix LTD., London (GB)

(72) Inventors: Raoul Barbet, Paris (FR); Gaëlle Oliveau, Paris (FR); Jeason Suarez, Paris (FR); Martin Esquirol, Paris (FR); Orson Favrel, Paris (FR)

(73) Assignee: SQUARE ENIX LTD., London (GB)

( * ) Notice: Subject to any disclaimer, the term of this patent is extended or adjusted under 35 U.S.C. 154(b) by 0 days.

(21) Appl. No.: 16/709,718

(22) Filed: Dec. 10, 2019

(65) Prior Publication Data
US 2020/0114262 A1 Apr. 16, 2020

Related U.S. Application Data

(63) Continuation-in-part of application No. PCT/GB2019/052337, filed on Aug. 20, 2019.

(30) Foreign Application Priority Data

Sep. 26, 2018 (GB) ..................................... 1815725

(51) Int. Cl.
*A63F 13/52* (2014.01)
(52) U.S. Cl.
CPC .................................. *A63F 13/52* (2014.09)
(58) Field of Classification Search
CPC .......... A63F 13/52; A63F 13/67; A63F 13/56; A63F 13/5255; G06T 2200/24; G06T 15/02
See application file for complete search history.

(56) References Cited

U.S. PATENT DOCUMENTS

| | | | |
|---|---|---|---|
| 2011/0099476 A1 | 4/2011 | Snook et al. | |
| 2015/0339532 A1* | 11/2015 | Sharma | G06K 9/00744 345/633 |
| 2017/0206693 A1* | 7/2017 | Sharma | G06T 7/254 |

FOREIGN PATENT DOCUMENTS

| | | |
|---|---|---|
| JP | H10243211 A | 9/1998 |
| JP | 2010219864 A | 9/2010 |

OTHER PUBLICATIONS

Anonymous, "Create your own custom paintings in The Sims 4," Get Simply Ruthless, May 20, 2015, 14 pages [Online] [Retrieved Sep. 23, 2019] <URL: http://getsimplyruthless.blogspot.com/2015/05/create-your-own-custom-paintings-in.html>.
Anonymous, "Painting," The Sims Wiki: FANDOM powered by Wikia, Sep. 8, 2018, 8 pages [Online] [Retrieved Sep. 23, 2019] <URL: https://sims.fandom.com/wiki/Painting?oldid=838727>.
Anonymous, "The Sims 4," Wikipedia, Aug. 30, 2018, 21 pages [Online] [Retrieved Sep. 23, 2019] <URL: https://en.wikipedia.org/w/index.php?t%20itle=The%20Sims%204&oldid=857286821>.

(Continued)

Primary Examiner — John P. Dulka
(74) Attorney, Agent, or Firm — Fenwick & West LLP

(57) ABSTRACT

A computer program comprising instructions which, when executed by a computer, cause the computer to carry out a sketching routine in a video game, wherein, in the sketching routine, a character controlled by a user produces a sketch of one or more features in the character's field of view. A computer-readable medium having such a computer program stored thereon is also provided.

10 Claims, 19 Drawing Sheets

(56) References Cited

OTHER PUBLICATIONS

Jovic, J. "The Sims 4 Update: Paint from Reference Feature," Sims Community, Mar. 27, 2015, 4 pages [Online] [Retrieved Sep. 23, 2019] <URL: https://simscommunity.info/2015/03/27/the-sims-4-update-paint-from-reference-feature/>.
Kyprianidis, J.E. et al., "State of the "Art": A Taxonomy of Artistic Stylization Techniques for Images and Video," IEEE Transactions on Visualization and Computer Graphics, May 1, 2013, vol. 19, No. 5, pp. 866-885.
Lawonn, K. et al., "A Survey of Surface-Based Illustrative Rendering for Visualization: Surface-Based Illustrative Rendering," Computer Graphics Forum, Jan. 22, 2018, vol. 37, No. 6, pp. 205-234.
PCT International Search Report and Written Opinion, PCT Application No. PCT/GB2019/052337, dated Oct. 23, 2019, 13 pages.
Carl'S Sim Guides. "Sims 4 Painting Skill Guide & Painter Extraordinaire." YouTube, 1 page, see 4:33 to 4:50, Aug. 14, 2018, [Online] [Retrieved May 27, 2021], Retrieved from the internet <URL:https://www.youtube.com/watch?v=PrYagQ7o7ao>.
Nana'S Weblog. "FF15 Journey-8 'I want to Take a Close-Up Shot of the Lake Beast' & 'Cape Kaem' Walk." Rainbowcoast.net, 17 pages, Dec. 7, 2016, [Online] [Retrieved May 27, 2021], Retrieved from the internet <URL:http://rainbowcoast.net/?eid=883820>.
The Japan Patent Office, Office Action, Japanese Patent Application No. 2019-558779, dated May 7, 2021, six pages.

\* cited by examiner

| Sketch texture lookup table | | |
|---|---|---|
| Video rendering effect | Sketch texture | Example |
| VR1 | ST1 | |
| VR2 | ST2 | |
| VR3 | ST3 | |
| VR4 | ST4 | |
| VR5 | ST5 | |

*FIG. 7*

SKETCHING ROUTINE FOR VIDEO GAMES

CROSS-REFERENCE TO RELATED APPLICATIONS

This application is a continuation-in-part application of International PCT Application No. PCT/GB2019/052337 filed on Aug. 20, 2019, which claims priority to United Kingdom Patent Application No. 1815725.5, filed on 26 Sep. 2018, which are incorporated by reference herein in their entirety.

FIELD OF THE INVENTION

The present invention relates to video games, and more particularly to a graphical routine that may be included within a video game.

BACKGROUND TO THE INVENTION

There is a desire to increase a user's level of interest when playing a video game.

SUMMARY OF THE INVENTION

Embodiments relate to a computer program comprising instructions which, when executed by a computer, cause the computer to carry out a sketching routine in a video game, wherein, in the sketching routine, a character controlled by a user produces a sketch of one or more features in the character's field of view. The term "user" as used herein may be used interchangeably with the term "player", and the two terms should be treated as synonymous.

In one or more embodiments, in the sketching routine, more content is added to the sketch over time.

In one or more embodiments, during the sketching routine, the user can select one or more features within the character's field of view that are to be sketched in greater detail.

In one or more embodiments, the sketching routine can be terminated at any time by the user, to produce a finished sketch as at the time the sketching process was terminated.

Embodiments also relate to a computer-readable recording medium including a program which is executed by a computer apparatus to provide a video game that is progressed by controlling a character operated by a player in a three-dimensional virtual game world, the program causing the computer apparatus to function as: an image generator that carries out a sketching routine in the video game, wherein, in the sketching routine, the image generator generates images as a sketch of one or more features in the character's field of view.

In one or more embodiments, the program may further cause the computer apparatus to function as: a processor that determines more content within the character's field of view that is to be added to the sketch over time.

In one or more embodiments, the program may further cause the computer apparatus to function as: a processor that determines one or more features within the character's field of view that are to be sketched in greater detail based on input received from an input unit representative of a selection made by the player.

In one or more embodiments, the program further causes the computer apparatus to function as: a processor that terminates the sketching routine in response to user input received from the input unit at any time, to produce a finished sketch as at the time the sketching process was terminated.

In one or more embodiments, the program may further cause the image generator to only execute the sketching routine in predetermined locations within the three-dimensional virtual game world.

In one or more embodiments, the program may further cause the computer apparatus to function as: a processor that gives a reward of some kind to the player or to the character for having caused the image generator to execute the sketching routine and produce a sketch, thereby incentivising the user to implement the sketching routine.

In one or more embodiments, the program further causes the computer apparatus to function as: a display that displays the character's field of view to the player by means of a first-person virtual camera.

In one or more embodiments, the program further causes the computer apparatus to execute, in the sketching routine, an observing process in which input is received from the player via an input unit to cause the character to observe a scene in the character's field of view, as a precursor to sketching that particular scene.

In one or more embodiments, the program further causes the computer apparatus to execute, in the observing process, a view adjustment process in which input is received from the player via the input unit to cause an adjustment in the direction in which the character is looking, to thereby change the character's field of view and the scene that is to be sketched. For example, the program may further cause the computer apparatus to function as a virtual camera control unit operable to adjust the direction of the virtual camera, wherein adjusting the direction in which the character is looking comprises adjusting the direction of the virtual camera in response to input received from the player via the input unit.

In one or more embodiments, in the observing process, the sketching routine may confine the number of available views to a predetermined set.

In one or more embodiments, the program may further cause the image generator to apply visual markers within the character's field of view, to determine the subject-matter of the scene that is to be sketched.

In one or more embodiments, the program may further cause the computer apparatus to repeat the observing process after the corresponding sketching has been done, to enable the user to add more content or greater detail to the sketch.

In one or more embodiments, the program further causes the computer apparatus to increase the level of detail included in the sketch in dependence on the length of time for which the character observes the scene.

In one or more embodiments, the sketching routine is at least partially scripted, thereby simplifying the associated processing performed by the computer.

In one or more embodiments, the program may further cause the computer apparatus to receive input from the user via the input unit during the sketching routine to select objects within the character's field of view that are to be included in the sketch, or excluded from the sketch, or that are to be sketched in greater detail.

In one or more embodiments, in the sketching routine, the program may further cause the computer apparatus to function as an analysing and determining unit, to analyse the content of the scene in the character's field of view, and/or objects within the scene; to determine how the sketch is to be created and which objects are to be included in the sketch; and to generate data defining sketch lines to be included in the sketch.

In one or more embodiments, the program may further cause the analysing and determining unit to analyse the rendering data used to render the scene in the character's field of view, to determine the positions of edges of visible objects within the character's field of view, and thence generate data defining corresponding sketch lines to be included in the sketch.

In one or more embodiments, the program may further cause the analysing and determining unit to perform a contrast analysis in respect of the visible objects within the character's field of view, and to generate data defining sketch lines corresponding to the lines in the field of view that have the greatest level of contrast, or that have a level of contrast above a predetermined threshold level.

In one or more embodiments, the program may further cause the analysing and determining unit to retrieve, from a database, data defining pre-prepared sketch equivalents of the rendered objects displayed in the character's field of view.

In one or more embodiments, each object in the character's location in the game world may have a characteristic point, and the program may further cause the analysing and determining unit to determine whether the characteristic point of each object is included in the character's field of view, and, if the characteristic point of an object is included in the character's field of view, to include the respective object in the sketch.

In one or more embodiments, the program may further cause the analysing and determining unit to determine a sketch line texture to be applied when sketching an object. In one embodiment the program may further cause the analysing and determining unit to vary the sketch line texture dependent on the number of times the object is observed in the observing process.

In one or more embodiments, the program may further cause the analysing and determining unit to modify the generated data defining sketch lines by applying one or more sketching style settings. For example, the sketching style settings may include one or more of: line weight, line accuracy, sketching detail, line texture, line colour or line thickness.

In one or more embodiments, the program may further cause the display to present a menu or user interface through which the sketching style settings can be set by the user.

In one or more embodiments, the program may further cause the computer apparatus to function as a sketching style setting unit which automatically sets the sketching style settings. For instance, the program may cause the sketching style setting unit to set the sketching style dependent on an automatic evaluation of the processing capabilities of the computer, or of the speed or latency of the network if the computer is network-based, e.g. to lessen the graphical processing burden on the computer, or to reduce the amount of data that is being transmitted across the network.

In one or more embodiments, in the sketching routine, the program may further cause the computer apparatus to function as sketch texture determination unit, to determine a sketch texture to be applied to an object.

In one or more embodiments, the program may cause the sketch texture determination unit to determine the sketch texture to be applied to an object based on a corresponding video rendering effect that is applied to the object when rendering the scene in the character's field of view, e.g. by referring to a lookup table in which different video rendering effects are correlated with corresponding predetermined sketch textures.

In one or more embodiments, the program may cause the sketch texture determination unit to determine the sketch texture to be applied to an object by retrieving, from a database, a predetermined sketch texture corresponding to the object.

In one or more embodiments, once a sketch has been completed, the program may further cause the computer apparatus to function as data storage means via which the user is given the option to store, on a data storage device, an image of the sketch or a video of the sketch being produced, for subsequent retrieval or sharing with others.

In one or more embodiments, the computer may be a video game apparatus such as a personal computer or a video game console; or may be a network server hosting the game; or may be a user terminal running a network-based game.

Embodiments also relate to a computer-readable recording medium having stored thereon the computer program of the first aspect of the invention.

Embodiments relate to a computer program comprising instructions which, when executed by a computer, cause the computer to carry out a sketching routine in a video game, wherein, in the sketching routine, a character controlled by a user produces a sketch of one or more features in the character's field of view.

BRIEF DESCRIPTION OF THE DRAWINGS

Embodiments of the invention will now be described, by way of example only, and with reference to the drawings in which:

FIG. 7 is a schematic illustration of a sketch texture lookup table to which the subroutine of FIG. 5 may refer;

DETAILED DESCRIPTION OF PREFERRED EMBODIMENTS

The present embodiments represent the best ways known to the Applicant of putting the invention into practice. However, they are not the only ways in which this can be achieved.

Embodiments of the present invention provide a graphical sketching routine that forms part of a video game. The video game is provided as a computer program. The computer program may be supplied on a computer-readable medium (e.g. a non-transitory computer-readable recording medium such as a CD or DVD) having computer-readable instructions thereon. Alternatively the computer program may be provided in a downloadable format, over a network such as the Internet, or may be hosted on a server.

Figure 1:
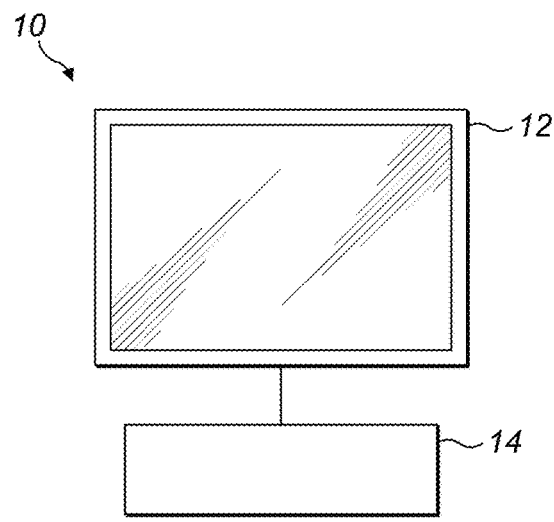
FIG. 1 schematically illustrates a video game apparatus (for example a personal computer or a video game console) on which a video game which incorporates an embodiment of the present invention may be played.

With reference to FIG. 1, the video game program may be executed on a video game apparatus 10, such as a personal computer or a video game console. The video game apparatus 10 comprises a display screen 12 on which the video game is displayed, and a control unit 14 which typically includes at least a Central Processing Unit (CPU), a Read Only Memory (ROM) and a Random Access Memory (RAM). The control unit 14 may also include a Graphics Processing Unit (GPU) and a sound processing unit. The display screen 12 and the control unit 14 may be provided in a common housing, or may be separate connected units. The video game apparatus 10 also includes one or more user input devices by which the user can control a player character in the game. Such a user input device may comprise, for example, a mouse, a keyboard, a hand-held controller (e.g. incorporating a joystick and/or various control buttons), or a touchscreen interface integral with the display screen 12 (e.g. as in the case of a smartphone or a tablet computer). The video game apparatus 10 may be connected to a network such as the Internet, or may be stand-alone apparatus that is not connected to a network.

Figure 2:
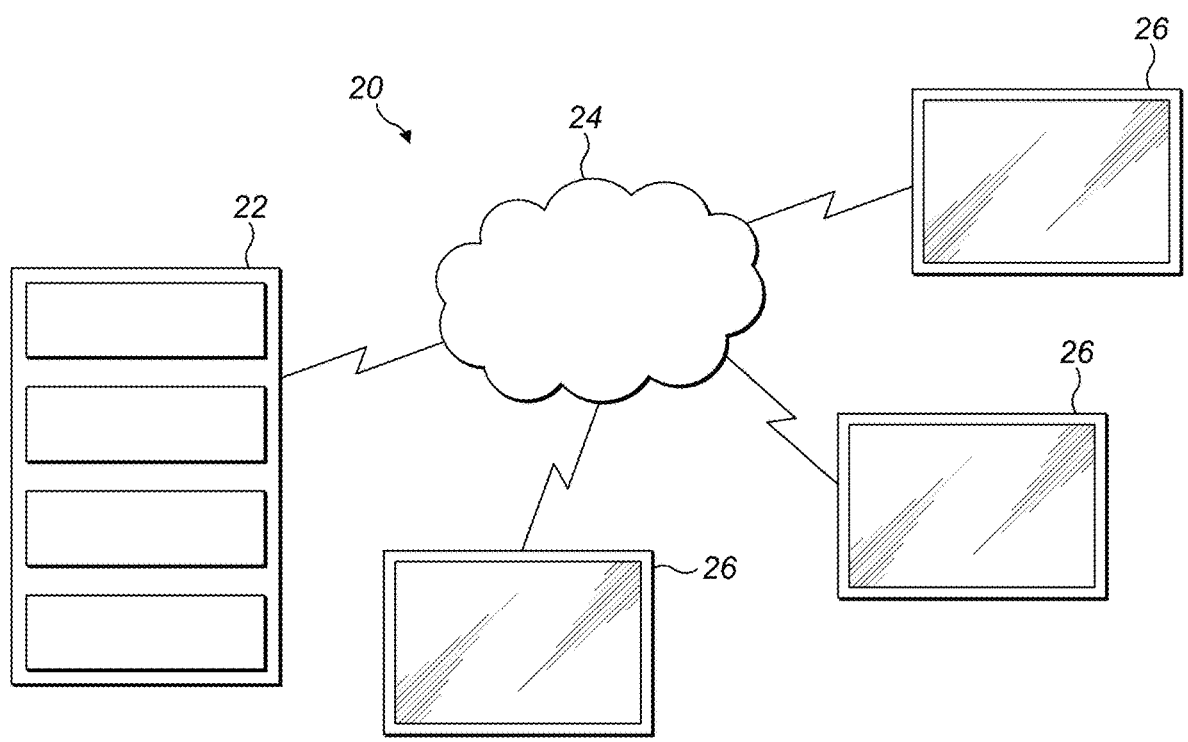
FIG. 2 schematically illustrates a network-based video game system comprising a server and a plurality of client terminals, on which terminals a video game which incorporates an embodiment of the present invention may be played.

Alternatively, with reference to FIG. 2, the video game program may be executed within a network-based video game system 20. The video game system 20 comprises a server device 22, a communication network 24 (e.g. the Internet), and a plurality of user terminals 26 operated by respective users. The server device 22 communicates with the user terminals 26 through the communication network 24. Each user terminal 26 may comprise a network-connectable video game apparatus 10 as described above, such as a personal computer or a video game console, or a smartphone, a tablet computer, or some other suitable piece of user equipment. The video game program may be executed on the server 22, which may stream user-specific game content (e.g. video in real time) to each of the plurality of user terminals 26. At each user terminal the respective user can interact with the game and provide input that is transmitted to the server 22, to control the progress of the game for the user. Alternatively, for a given user, the video game program may be executed within the respective user terminal 26, which may interact with the server 22 when necessary.

In either case, the video game progresses in response to user input, with the user input controlling a player character. The user's display screen may display the player character's field of view in the game world in a "first-person" manner, preferably in three dimensions, and preferably using animated video rendering (e.g. photorealistic video rendering in particular), in the manner of a virtual camera.

At other times, the user's display screen may display the player character and other objects or characters in the game world in a "third-person" manner, again preferably in three dimensions, and preferably using animated video rendering (e.g. photorealistic video rendering in particular), in the manner of a virtual camera.

Figure 8:
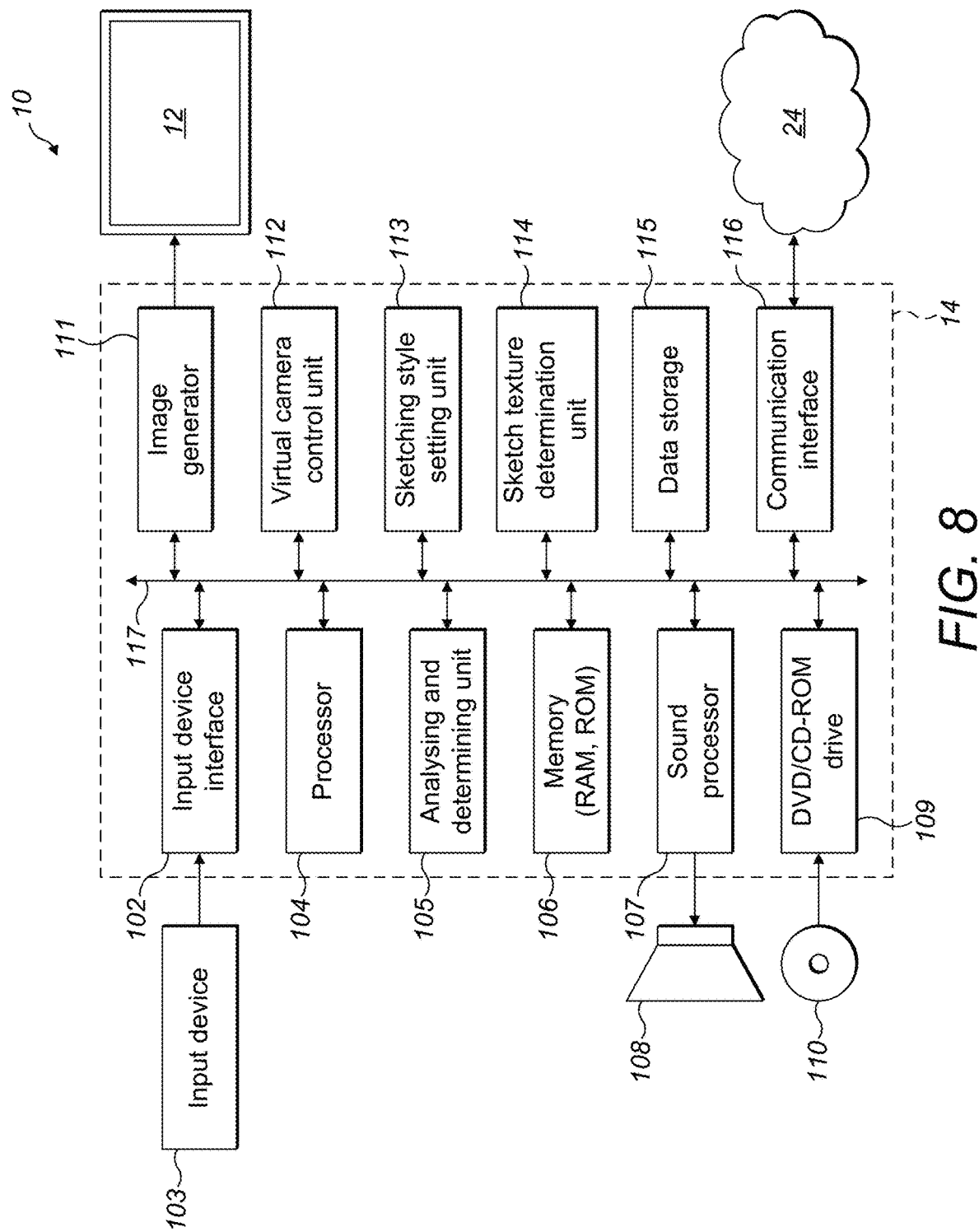
FIG. 8 is a block diagram showing the configuration of a video game apparatus as shown in FIG. 1.

FIG. 8 is a block diagram showing the configuration of the video game apparatus 10 shown in FIG. 1, in the case of the game being executed on such apparatus. It will be appreciated that the contents of the block diagram are not exhaustive, and that other components may also be present.

As illustrated, the control unit 14 of the video game apparatus 10 includes an input device interface 102 to which an input device 103 (e.g. a mouse, a keyboard or a hand-held controller, e.g. incorporating a joystick and/or various control buttons, as mentioned above) is connected, a processor (e.g. CPU) 104, and an image generator (e.g. GPU) 111 to which a display unit 12 is connected.

The control unit 14 also includes memory (e.g. RAM and ROM) 106, a sound processor 107 connectable to a sound output device 108, a DVD/CD-ROM drive 109 operable to receive and read a DVD or CD-ROM 110 (both being examples of a computer-readable recording medium), a communication interface 116 connectable to the communication network 24 (e.g. the Internet), and data storage means 115 via which data can be stored on a storage device (either within or local to the video game apparatus 10, or in communication with the control unit 14 via the network 24). For a stand-alone (not network connected) video game apparatus, the communication interface 116 may be omitted.

The video game program causes the control unit 14 to take on further functionality of a virtual camera control unit 112, a sketching style setting unit 113, a sketch texture determination unit 114, and a scene content analysing and sketch content determining unit 105.

An internal bus 117 connects components 102, 104, 105, 106, 107, 109, 111, 112, 113, 114, 115 and 116 as shown.

Figure 9:
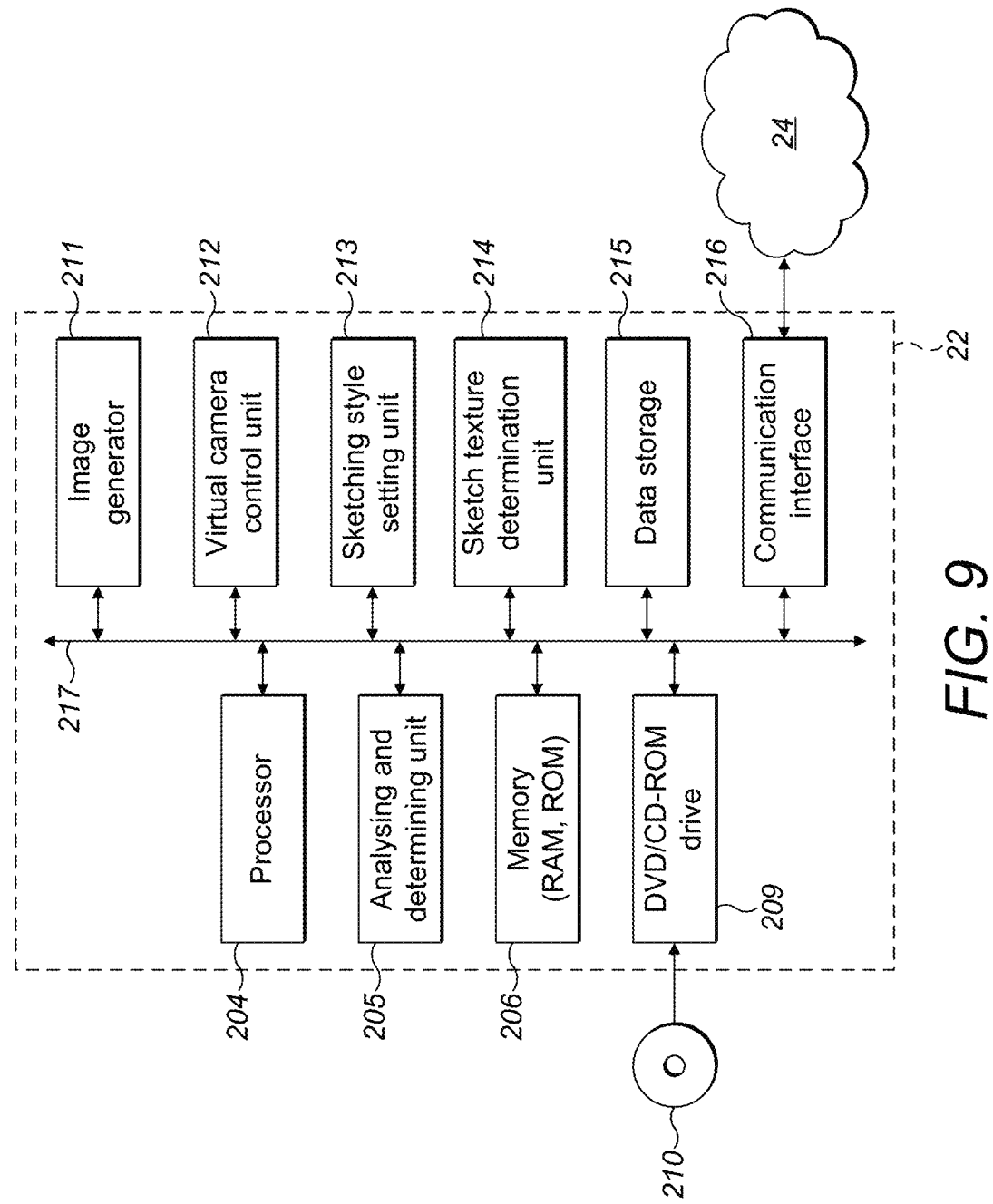
FIG. 9 is a block diagram showing the configuration of a server as shown in FIG. 2.

FIG. 9 is a block diagram showing the configuration of the server apparatus 22 shown in FIG. 2, in the case of the game being executed within a network-based video game system. It will be appreciated that the contents of the block diagram are not exhaustive, and that other components may also be present.

As illustrated, the server apparatus 22 includes a processor (e.g. CPU) 204, and an image generator (e.g. GPU) 211, memory (e.g. RAM and ROM) 206, a DVD/CD-ROM drive 209 operable to receive and read a DVD or CD-ROM 210 (both being examples of a computer-readable recording medium), a communication interface 216 connected to the communication network 24 (e.g. the Internet), and data storage means 215 via which data can be stored on a storage device (either within or local to the server apparatus 22, or in communication with the server apparatus 22 via the network 24).

The video game program causes the server apparatus 22 to take on further functionality of a virtual camera control unit 212, a sketching style setting unit 213, a sketch texture determination unit 214, and a scene content analysing and sketch content determining unit 205.

An internal bus 217 connects components 204, 205, 206, 209, 211, 212, 213, 214, 215 and 216 as shown.

Via the communication interface 216 and the network 24, the server apparatus 22 may communicate with a user terminal 26 (e.g. video game apparatus 10) as mentioned above, during the course of the video game. Amongst other things, the server apparatus 22 may receive user input from the input device 103 of the video game apparatus 10, and may cause video output to be displayed on the display screen 12 of the video game apparatus 10.

Sketching Process

In accordance with the present disclosure, to increase the user's level of interest in the video game, the player character controlled by the user has a hobby of sketching. Alternatively, the player character may be an artist by profession.

More particularly, the player character (under the control of the user) is able to produce a sketch within the game, of what is in the player character's field of view in the game world. Preferably the player character's field of view in the game world is three-dimensional and animated, and is generally displayed to the user in the manner of a first-person virtual camera. Visually, the sketch has the impression of being hand-drawn, e.g. by a pencil or pen, e.g. in a journal, notepad or sketchbook. The sketches described herein may alternatively have the impression of being painted (i.e. painted in a sketch-like manner).

The sketching process is carried out as a subroutine within the overall game. In the presently-preferred embodiment the sketching process is possible only in predetermined places or sections of the game, in which the user is given the option of executing the sketching routine. However, in alternative embodiments the user may be able to execute the sketching routine at any point in the game they wish, in any location within the game world.

As well as the user gaining pleasure as a result of the player character producing such a sketch, the player character (or the user) may be rewarded in some way for creating one or more sketches during the course of the game, thereby motivating the user to cause the player character to do this. For instance, the user may be motivated to produce a collection of sketches in the player character's journal, notepad or sketchbook.

When the player character is producing such a sketch, the user can terminate the sketching process at any time, e.g. at an early stage, when the sketch is still relatively rough and unfinished, or at a later stage, when it contains more detail. During the sketching process, the user can select a part of the player character's field of view that he or she wishes to be sketched in more detail, and the sketching process responds accordingly, to include more detail in the corresponding part of the sketch.

Figure 3A:
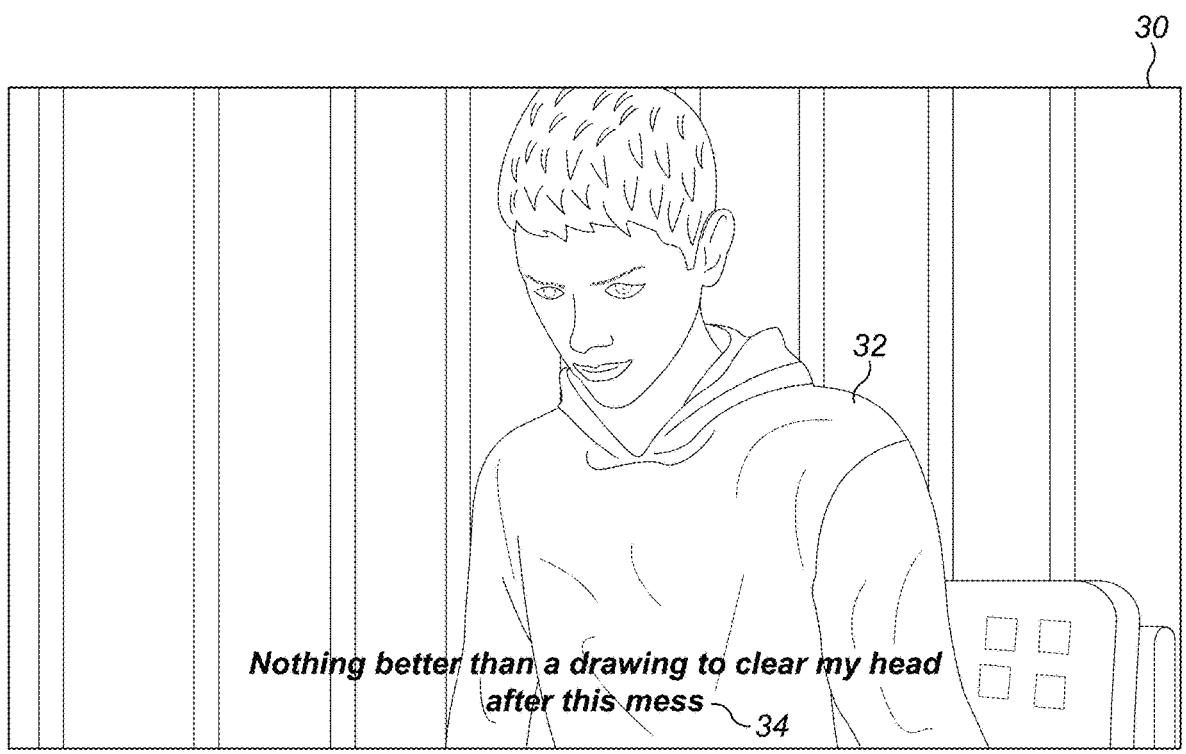
FIGS. 3A to 3W depict a series of screen shots of successive stages throughout an exemplary sketching routine according to an embodiment of the invention.
Figure 3B:
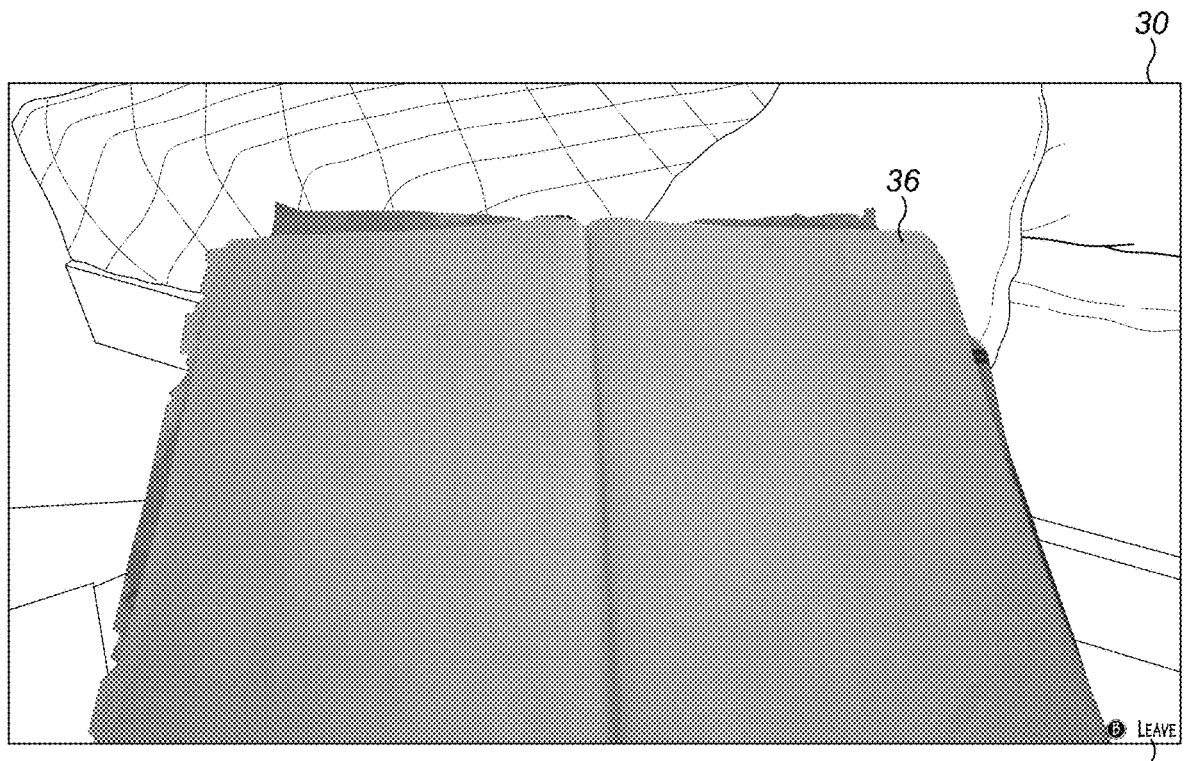
Figure 3C:
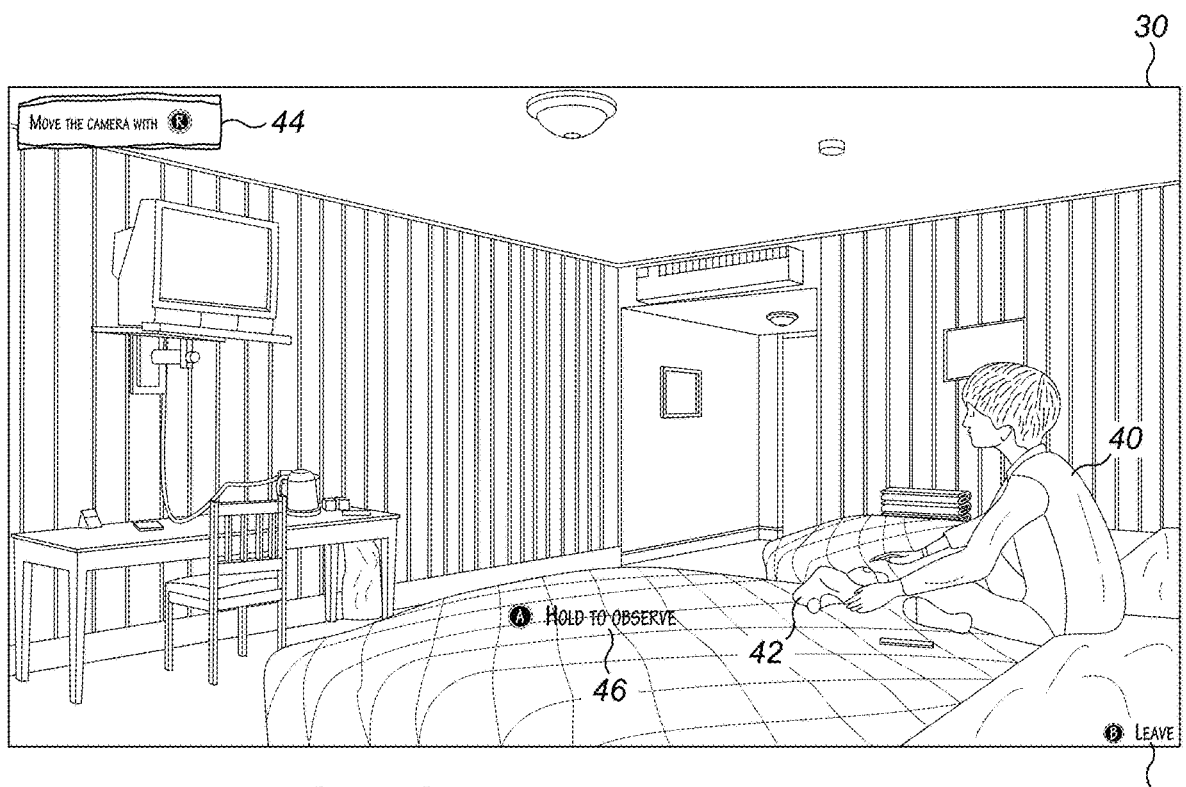
Figure 3D:
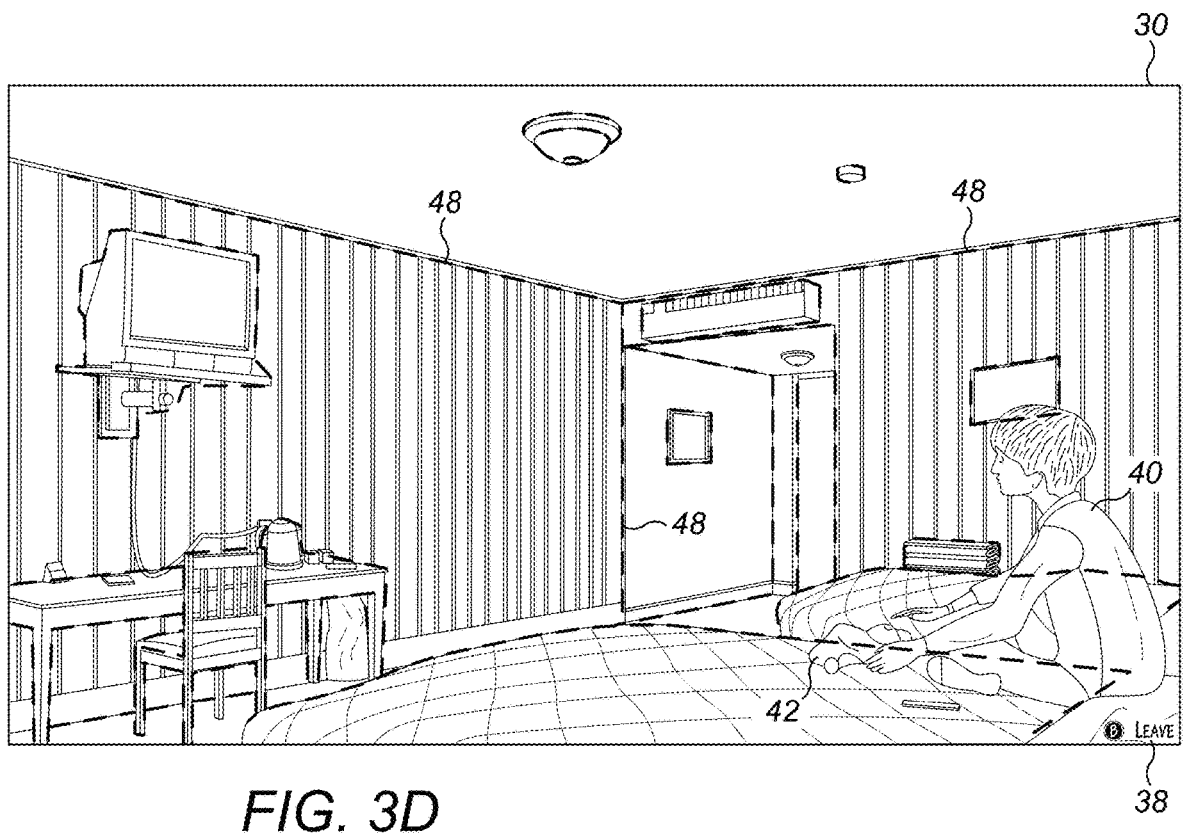
Figure 3E:
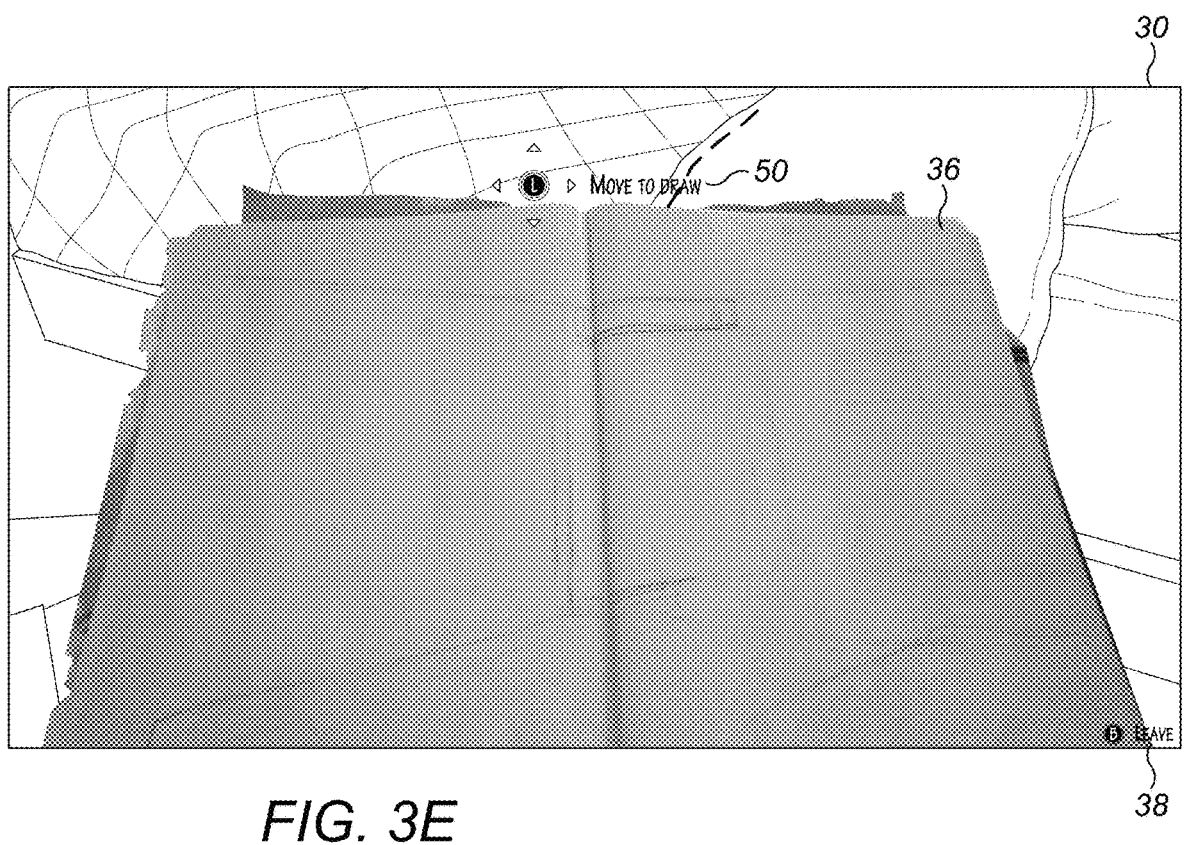
Figure 3F:
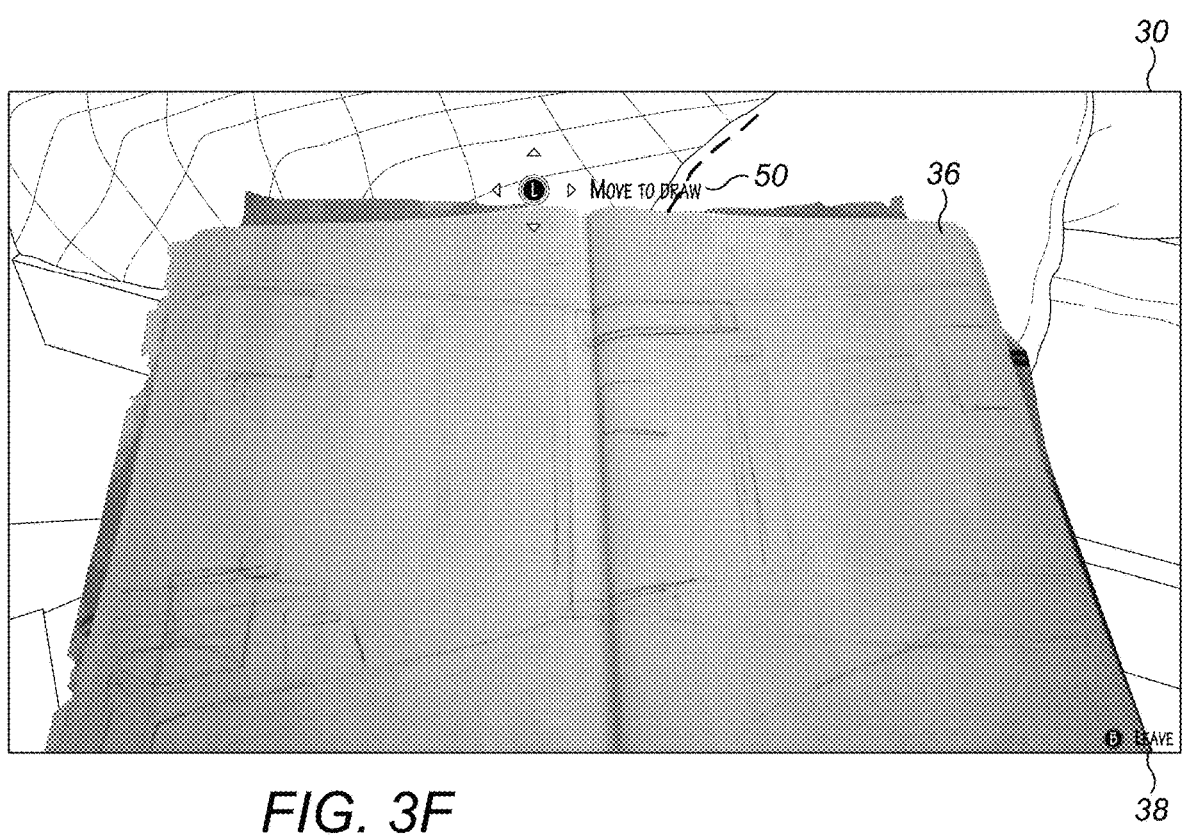
Figure 3G:
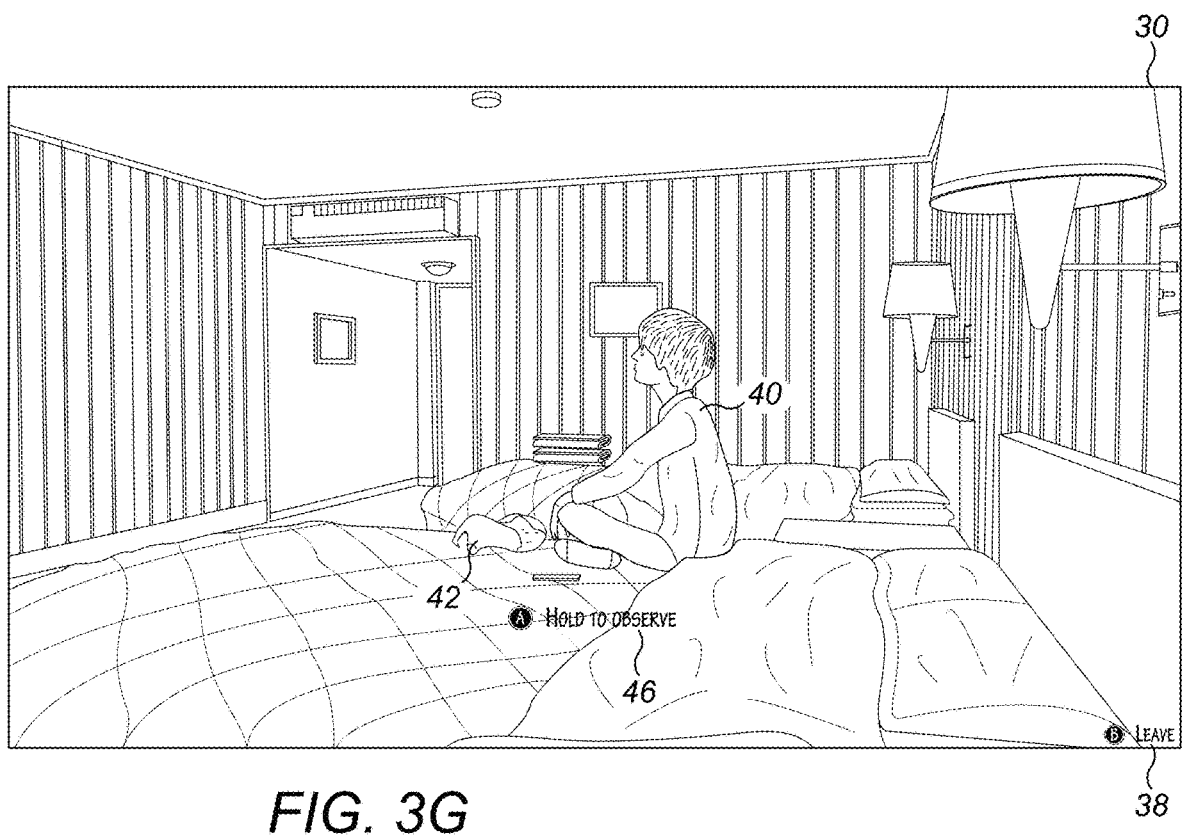
Figure 3H:
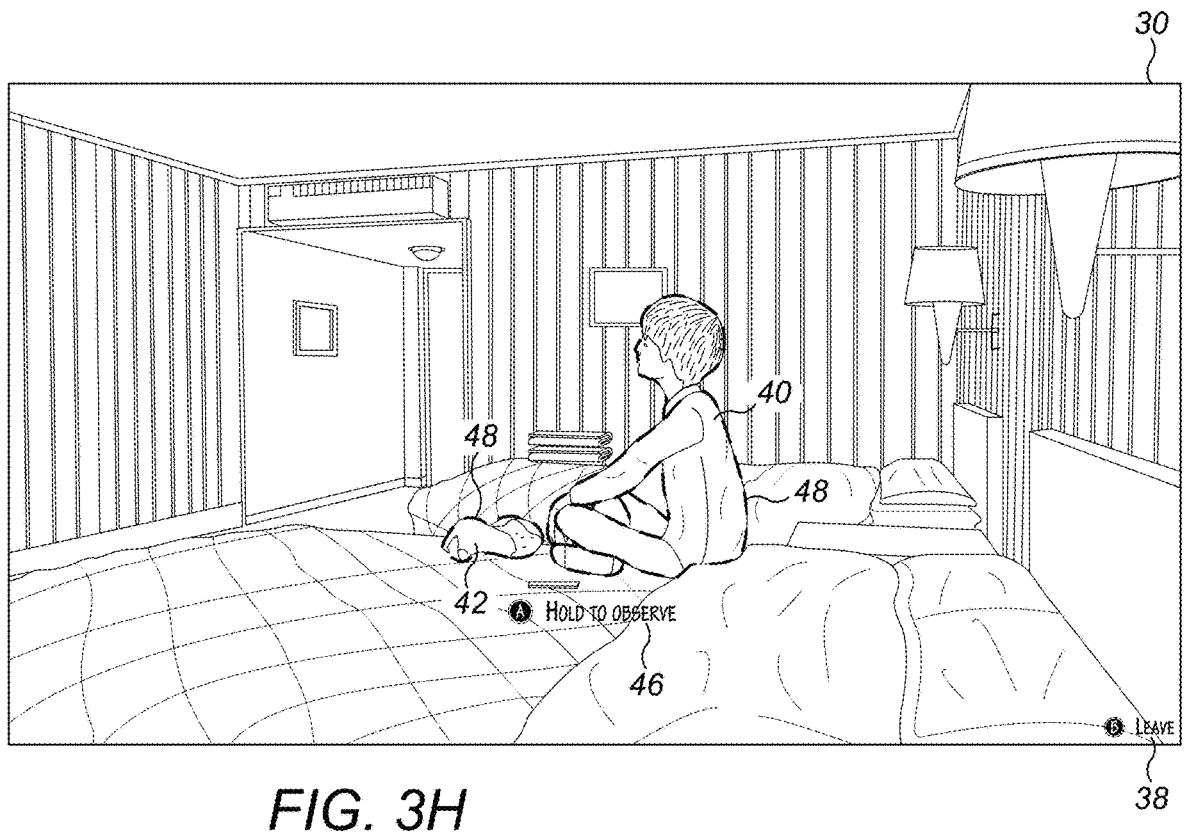
Figure 3I:
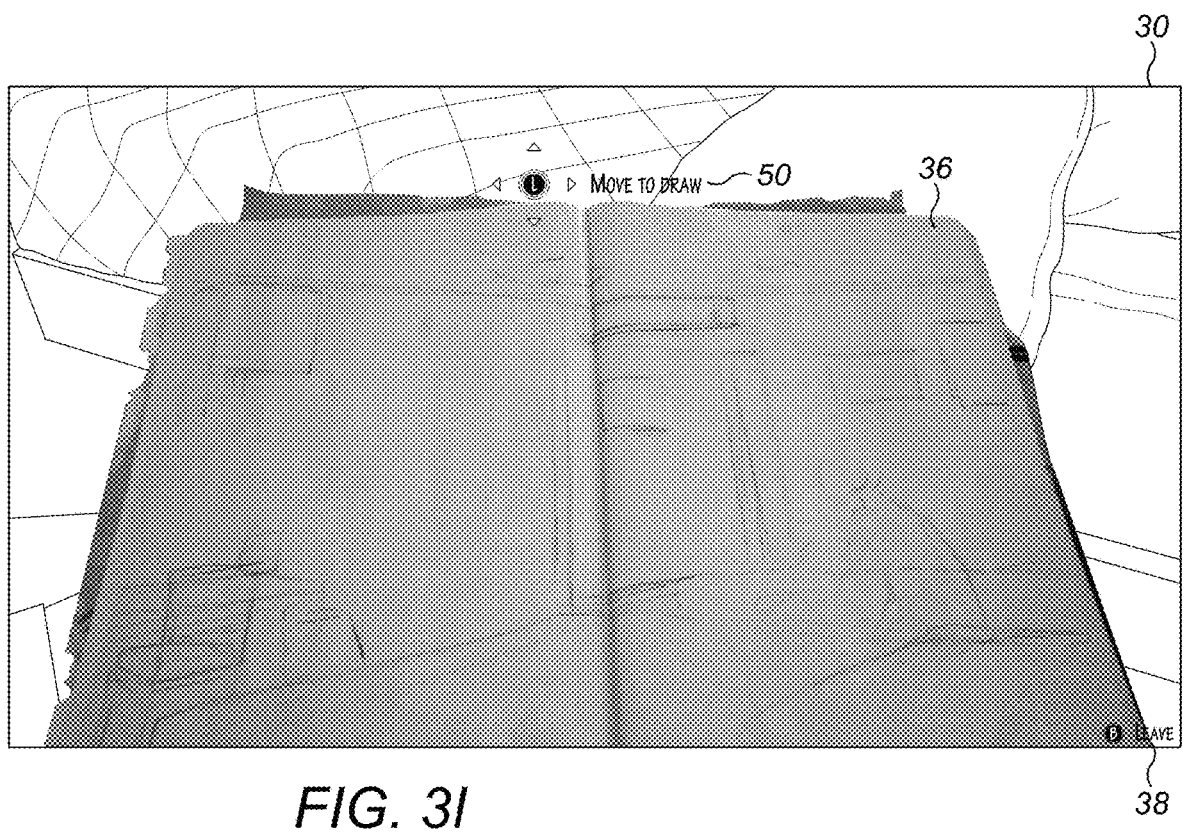
Figure 3J:
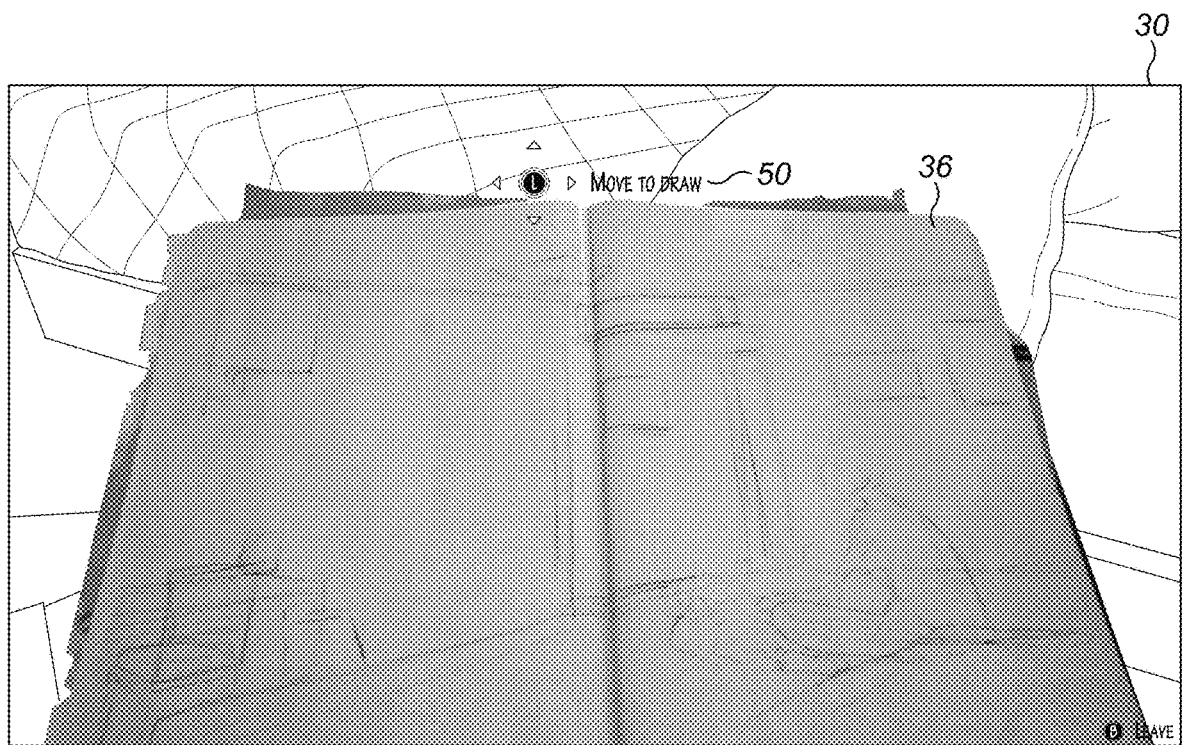
Figure 3K:
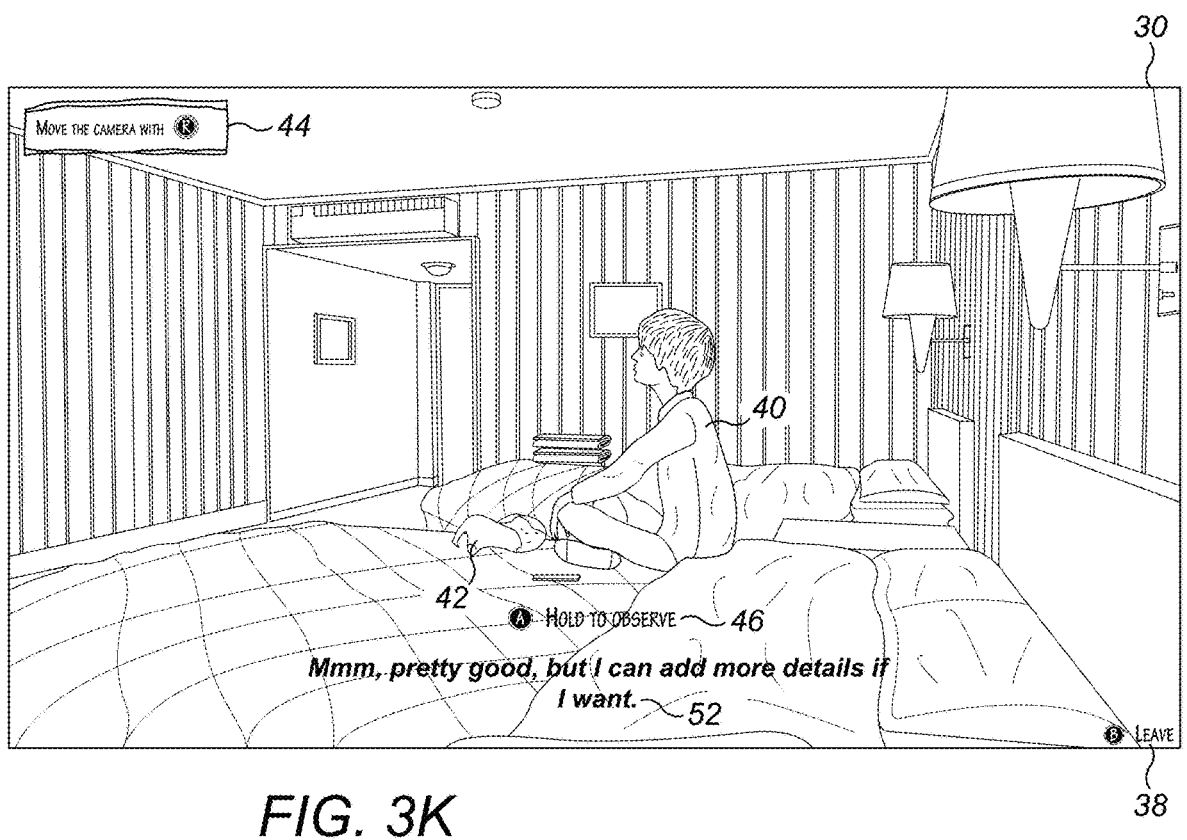
Figure 3L:
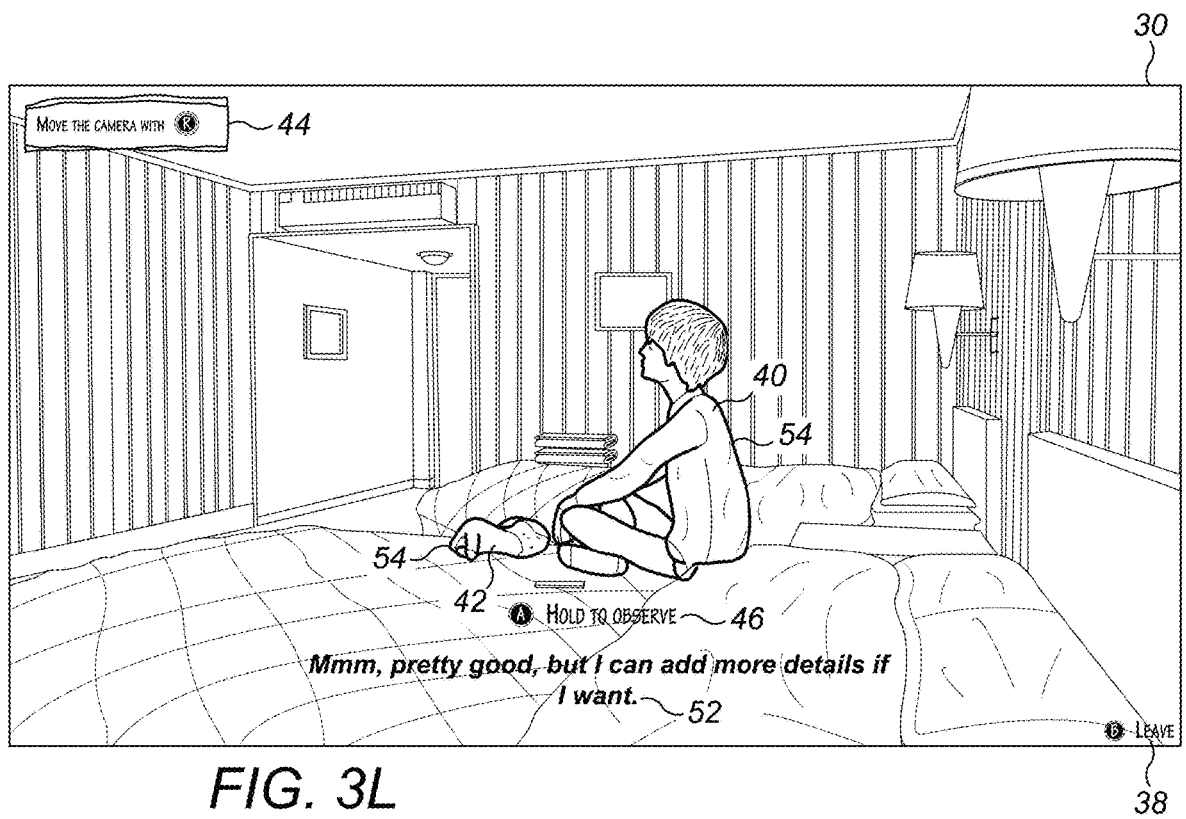
Figure 3M:
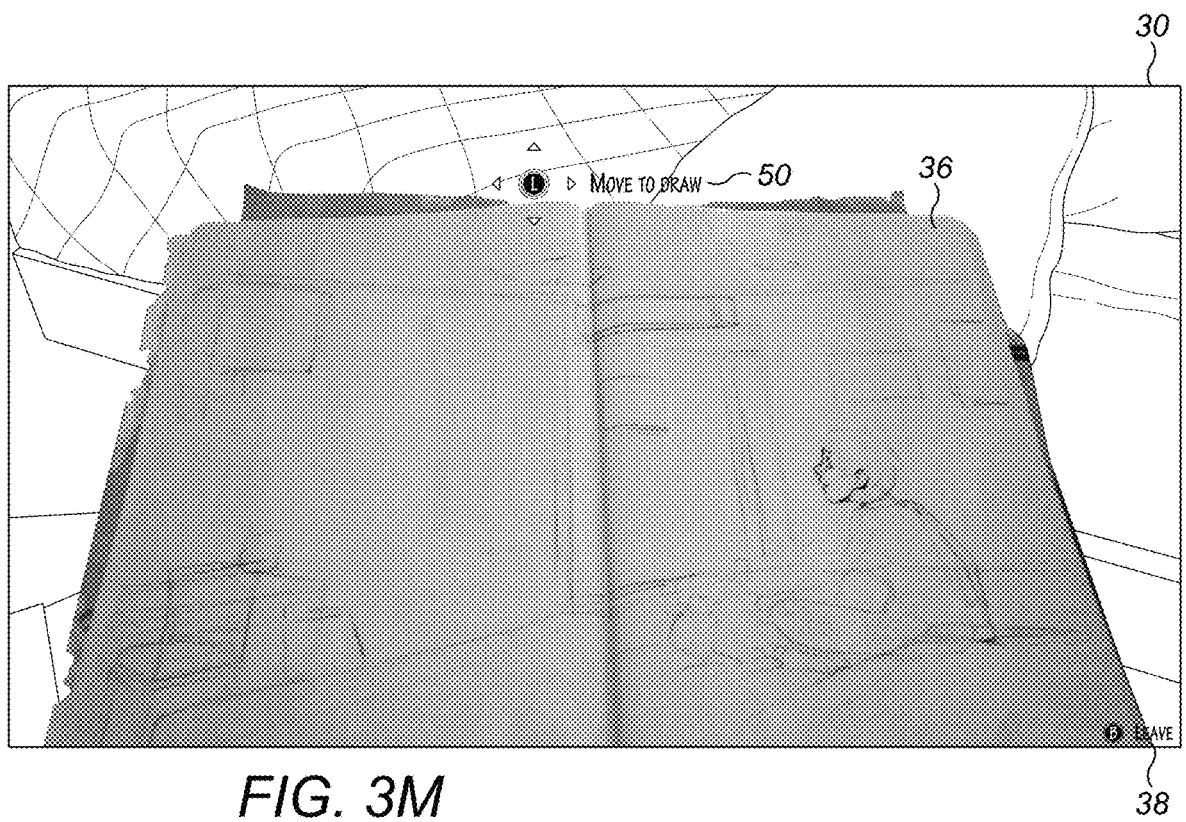
Figure 3N:
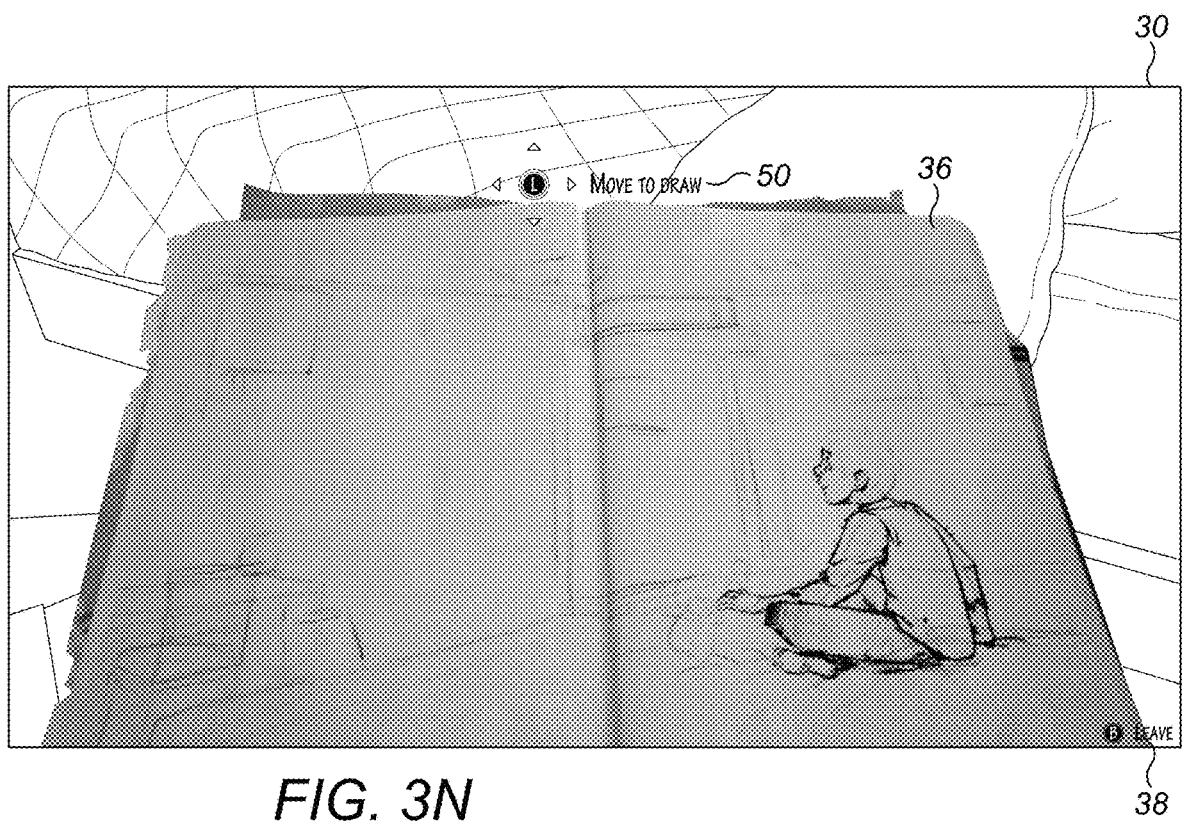
Figure 3O:
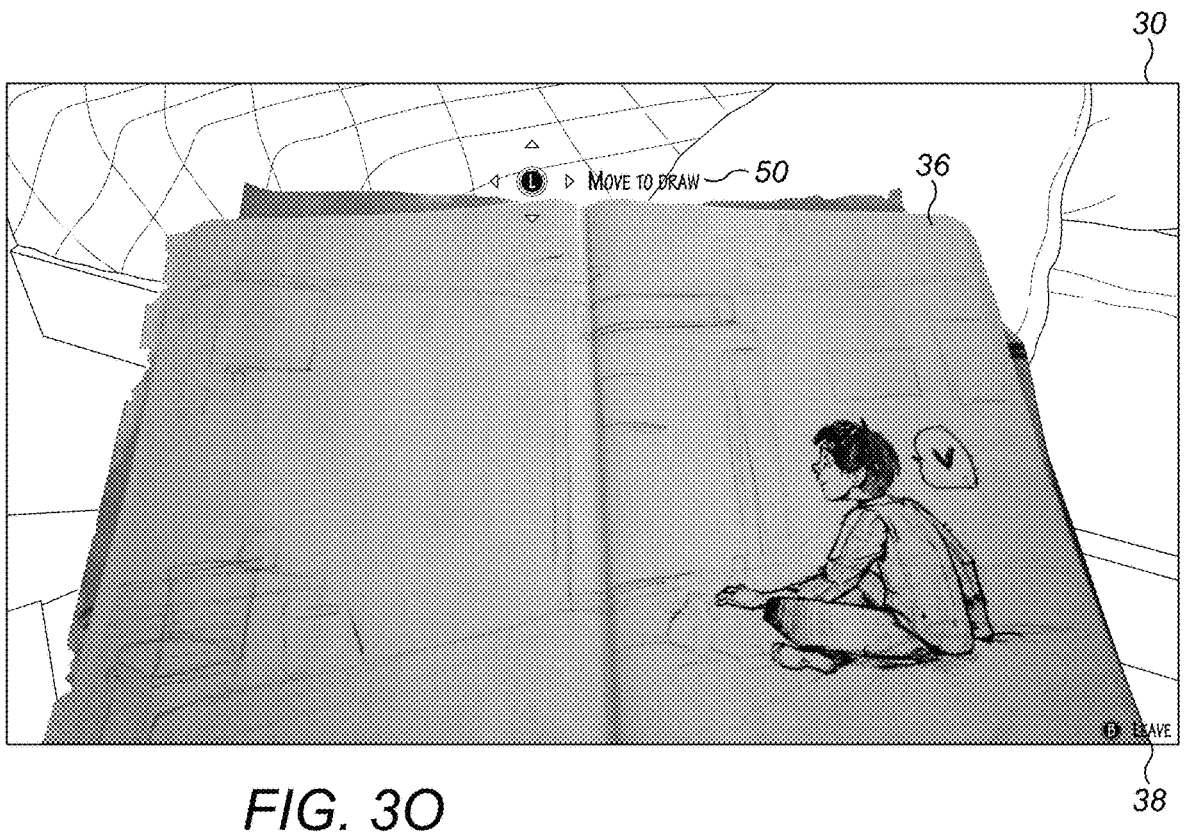
Figure 3P:
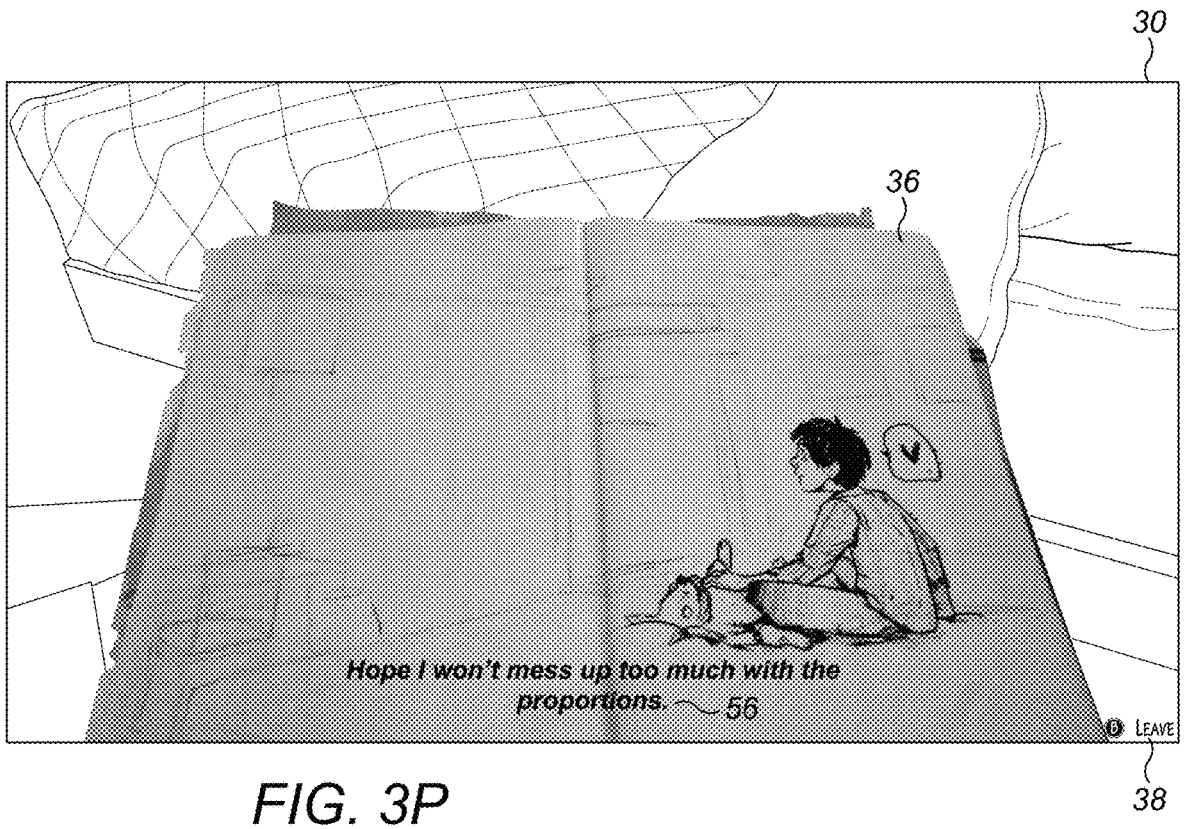
Figure 3Q:
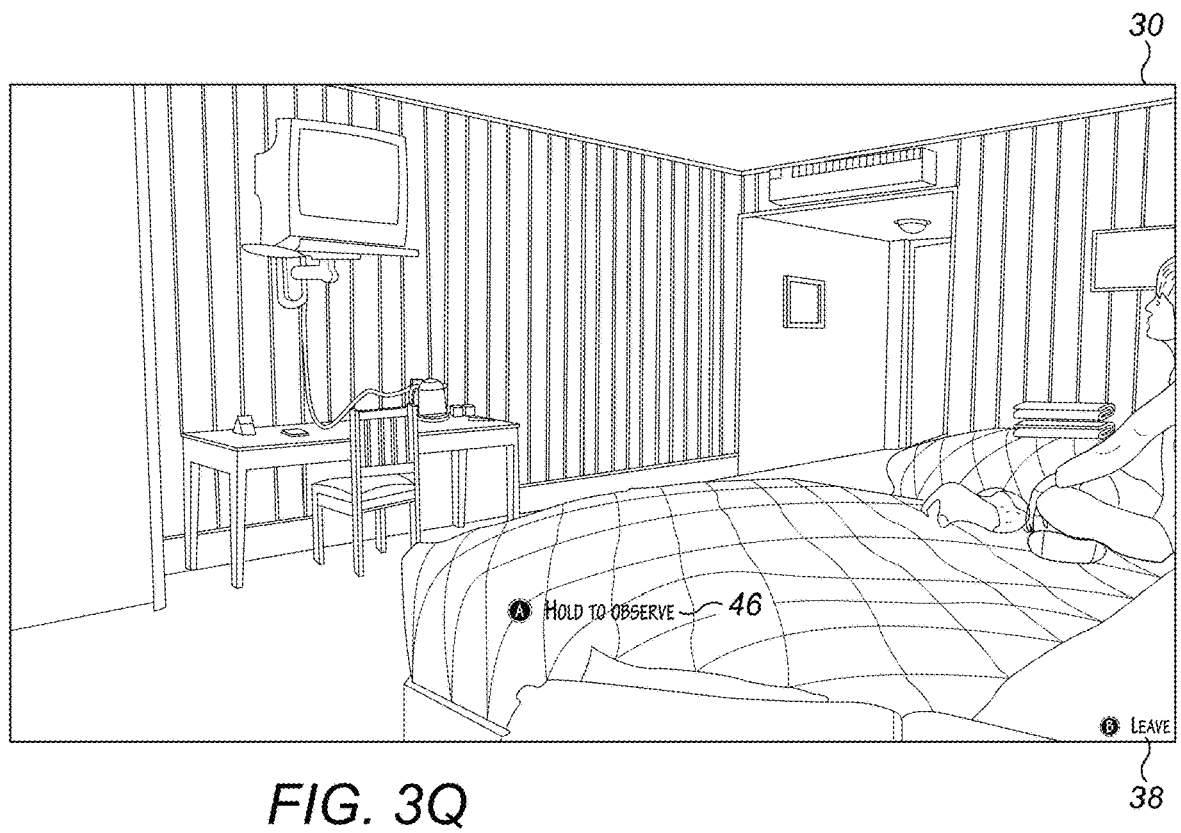
Figure 3R:
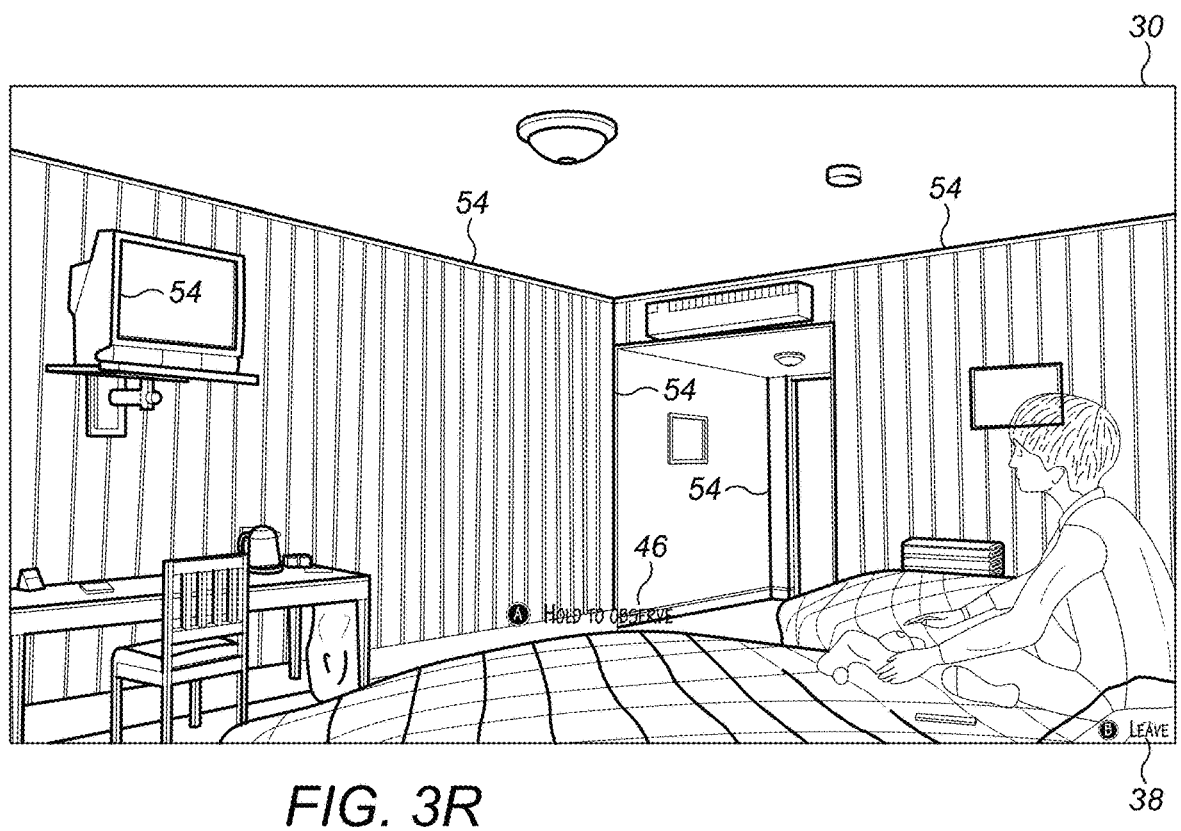
Figure 3S:
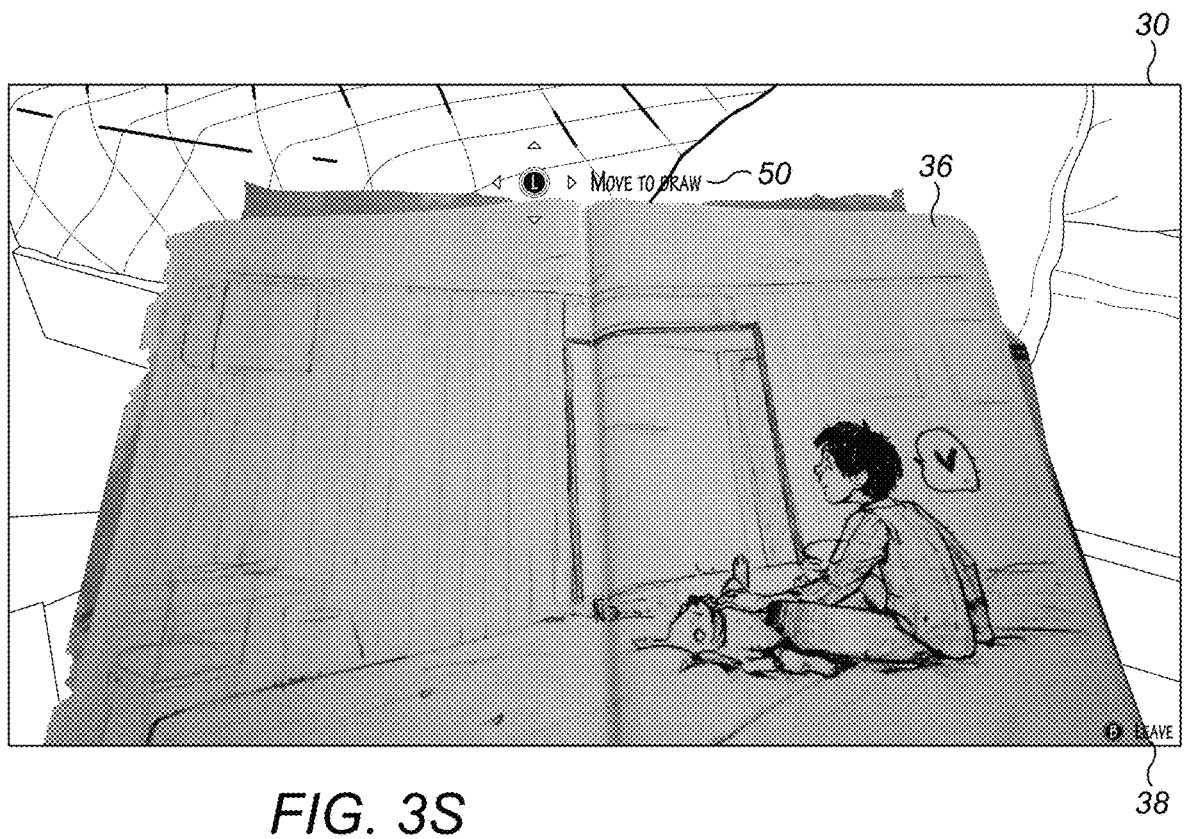
Figure 3T:
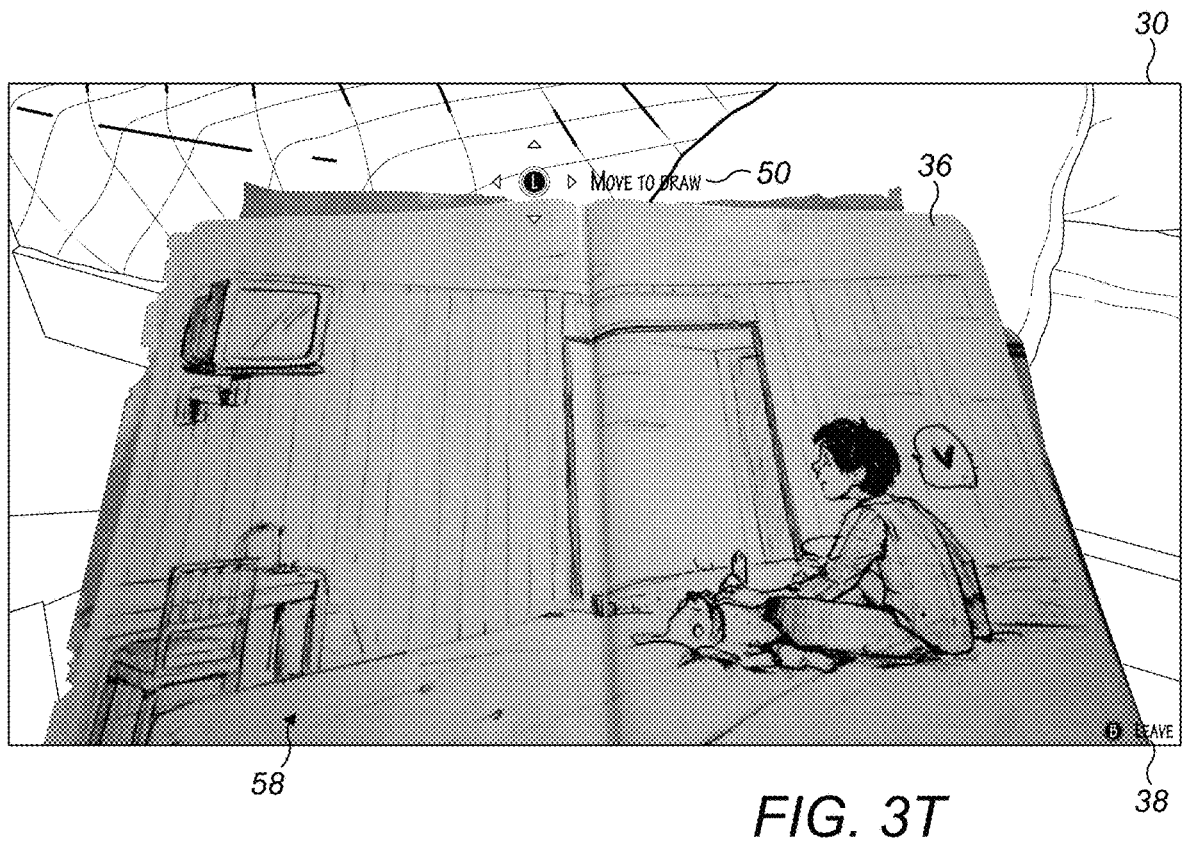
Figure 3U:
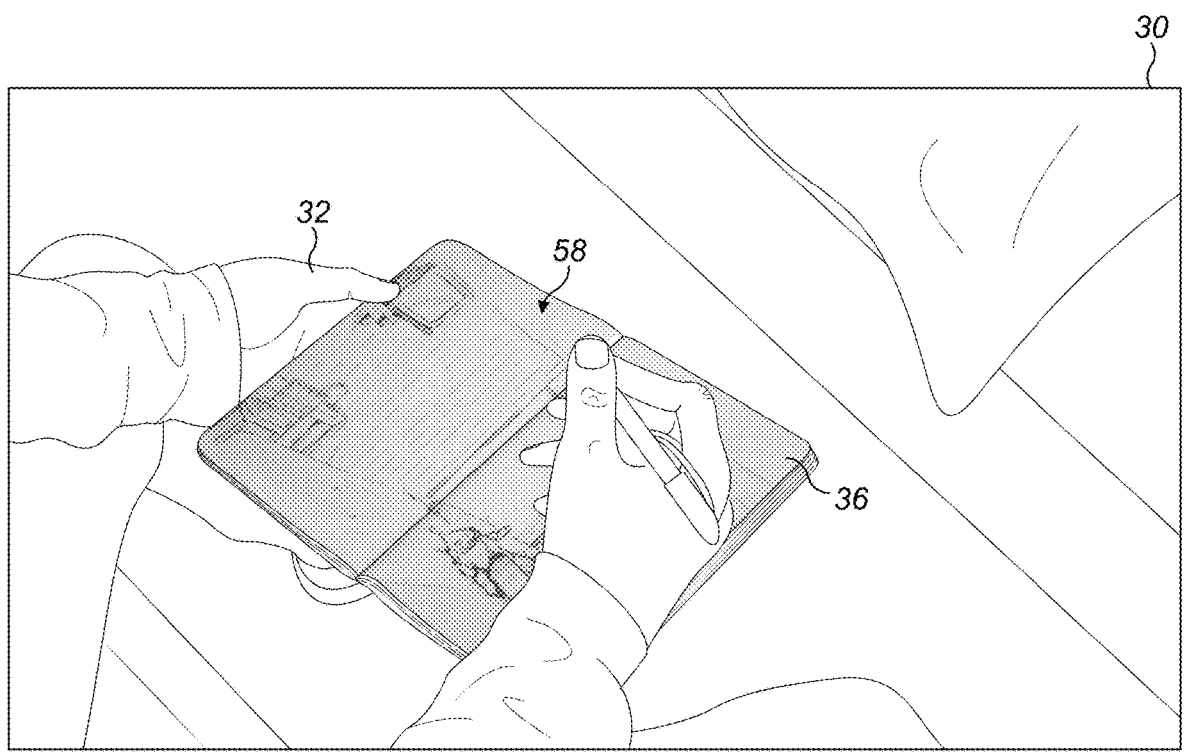
Figure 3V:
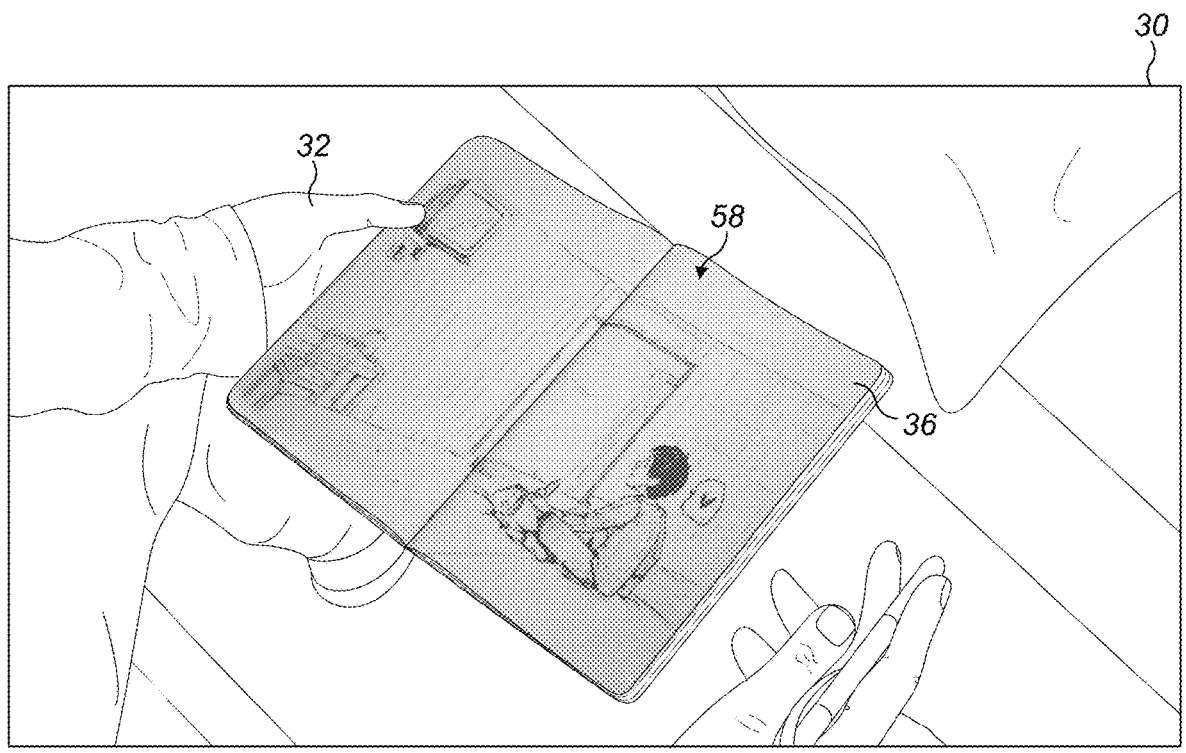
Figure 3W:
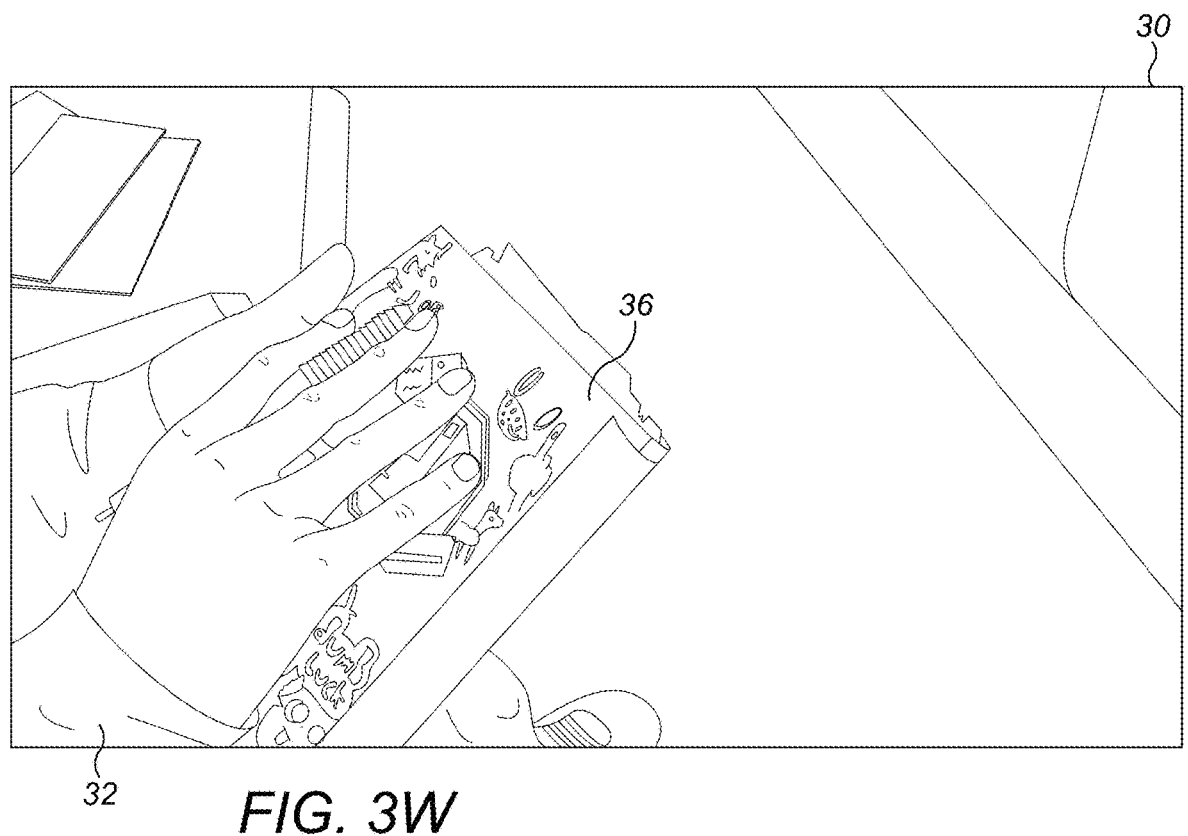

FIGS. 3A to 3W depict a series of screen shots of successive stages throughout an exemplary sketching routine in accordance with the present disclosure, as generated by image generator 111/211 under the control of processor 104/204 (see FIGS. 8 and 9). In practice, animation (including video effects such as zooming and panning) is used to smoothly transition through the sequence of views captured in the present screenshots, and to show movement of the characters. It should be noted that, in the present FIGS. 3A to 3W, black and white line drawings are used to represent what would be displayed to the user as rendered video (preferably photorealistic video rendering) in the game, whereas the sketched elements (within sketchbook 36, as discussed below) are reproduced essentially as they would appear in the game.

In FIG. 3A, the screen 30 shows the user's player character 32 just before the sketching routine is initiated, in a third-person manner.

The user provides input (via input device 103 of FIG. 8) to cause the sketching routine to begin, to cause the player character 32 to produce a sketch in respect of what is in the character's field of view. This causes the screen to change, to show the player character's field of view from here on in a first-person manner (as shown in the following figures, FIGS. 3B to 3W). Other embodiments may change between first-person and third-person views in any sequence.

A textual caption 34 representing the thoughts of the player character 32 at that moment in the game may also be displayed, as illustrated. The textual caption 34 may in some cases provide a hint to the user as to what they should do to progress with the sketching routine or the game in general.

In the presently-preferred embodiment the textual content of caption 34 is a pre-prepared (scripted) string of text, specific to that particular stage of the sketching routine (or that particular stage of the game more generally), and/or that particular location of the player character 32 in the game world, such that the same string of text is always displayed at that particular stage/location. However, in alternative embodiments, the video game program may select one of a plurality of pre-prepared strings of text (e.g. from a table or database) to display at that particular stage, and/or at that particular location. The selection may be made at random from the plurality of alternative possibilities. Alternatively, the selection may be made based on one or more other factors, such as the user's performance in the game thus far, or when playing on previous occasions; the sketching activity itself; the location of the player character 32 in the game world; the behaviour of other characters in the game; the time or date; or external factors (e.g. as may be obtained from the Internet, such as the current weather in the user's real-world location, current news stories, social media feeds, etc.). The same principles apply for the other textual captions described below, at later stages of the sketching routine.

In FIG. 3B, the screen 30 (now showing the player character's field of view) shows a close-up of empty pages within the player character's sketchbook 36, in which the player character will produce the sketch. It should also be noted that, in FIG. 3B and subsequently in FIGS. 3C to 3T), an on-screen caption "(B) LEAVE" 38 is displayed, indicating to the user that they may leave the sketching routine at any time by providing specific input via their input device 103. In this case, to cause the sketching routine to be left, the user would need to press a particular button (in this example, the "B" button) on their input device (hand-held game controller) 103. In other embodiments, alternative forms of input may be provided to cause the sketching routine to be left, including providing a specific voice command (if voice control is being used) or making a specific gesture (if gesture recognition is employed).

Observing

In FIG. 3C, the screen 30 shows the player character's field of view of the game world when looking up from the sketchbook. In this example, the game world is a hotel bedroom in which the player character's younger brother 40 and his pet dog 42 are also located. In response to on-screen caption "(A) HOLD TO OBSERVE" 46, the user provides input (in this case, holding down a control button "A" on their game controller) to cause the player character to observe the scene that is currently in the player character's field of view, as a precursor to sketching that particular scene. In other embodiments, alternative buttons or other forms of input may be used to cause the player character to observe the scene in the player character's field of view. It should be noted that the term "observing" (and variants thereof) as used herein refer to the viewing of a scene by the player character for the specific purpose of sketching that scene, i.e. in the manner of an artist who studies a scene before drawing it. It should also be noted that, for each instance of sketching, the scene that is observed broadly corresponds to the scene that is sketched.

In the "observing" process, the scene that is currently in the player character's field of view may be changed by adjusting the direction in which the player character is looking (i.e. the direction of the first-person virtual camera, essentially as controlled by the virtual camera control unit 112/212 of FIG. 8 or 9). In this case, this is done by pressing a control button "R" on the user's game controller in response to on-screen caption 44 ("MOVE THE CAMERA WITH (R)"), and by operating a joystick or pressing directional buttons on the user's game controller to change the player character's field of view, e.g. to move it up, down, left or right (and optionally to zoom in or out).

The available changes in views, and the corresponding scenes that may be observed, may be confined to a limited number of predetermined options at the player character's present location in the game world. For example, two or three adjacent scenes may be observed by the user moving the player character's field of view from left to right, or vice versa. However, in alternative embodiments the observing process may not be so limited, enabling the user to observe in any direction within the present location in the game world.

As shown in FIG. 3D, during the "observing" process, when the "observe" button is held down, visual markers (in this example, dotted lines) 48 may be applied to the field of view, to determine the scene that is to be sketched, and to identify the outlines of objects within the scene. This "fixes" the subject-matter of the sketch. The markers may optionally indicate a perimeter (i.e. outer limits) of what is to be sketched. In other embodiments, the markers may also outline internal features of objects. It should be noted that such visual markers are not essential to the present invention, and in alternative embodiments they may not be displayed.

Sketching

As illustrated in FIGS. 3E and 3F, the sketching process then begins in the player character's sketchbook 36. Prompted by on-screen caption "MOVE TO DRAW" 50, the sketching process progressively takes place as the user moves the joystick of their game controller in different directions (or, in alternative embodiments, provides other input). Initially (as in FIG. 3E) the drawing is sparse, but it evolves over time to include more content (as in FIG. 3F and the subsequent sketchbook views). In the case of moving the joystick to cause the sketching to take place, the user can move the joystick in any directions they wish, to cause the sketch to evolve. In the presently-preferred embodiment the content of the sketch, and the positions of the objects that are drawn, are not linked to the directions in which the user moves the joystick. However, in alternative embodiments objects or sketch lines may be preferentially drawn in positions on the sketchbook page that correspond to the directions in which the user moves the joystick.

The sketching process is depicted on-screen, progressively piece-by-piece, in the player character's journal, notepad or sketchbook 36. Textures of objects within the scene may be rendered using different sketching effects, e.g. cross-hatching for fabrics, occasional short diagonal lines for shiny surfaces, etc. The user can terminate the sketching process whenever they wish, at whichever degree of detail or content the sketch is currently at, e.g. by stopping the moment of the joystick in response to caption 50, or by pressing the "B" button to leave the sketching routine, as prompted by caption 38. The length of time the player character faces (i.e. observes) the scene before carrying out sketching (e.g. the abovementioned holding-down of control button "A" to cause the player character to observe the scene) may, or in alternative embodiments may not, influence the level of detail. In the latter case, the level of detail may change only depending on how many times the player character looks up from the sketch to reobserve the scene, as discussed below.

Reobserving and Further Sketching

With reference now to FIG. 3G, during a pause in the sketching process, the player character looks up again at the scene, to reobserve it. The user can then select a part of the field of view (in this example, the player character's brother 40 and the dog 42) that he or she wishes to be drawn in more detail within the sketch, e.g. by operating the joystick or pressing directional buttons on the user's game controller to direct the first-person field of view towards the objects that the user wishes to be drawn in more detail. The user provides input (e.g. holding down the aforementioned control button "A") to cause the player character to observe the scene again, in response to caption 46. As shown in FIG. 3H, visual markers (in this example, dotted lines) 48 may then be applied to the selected part of the field of view, to determine the features of the scene (in this example, the player character's brother 40 and the dog 42) that are to be sketched in more detail. As shown in FIGS. 3I and 3J, the sketching process then continues in the sketchbook 36, progressively piece-by-piece, by the user moving the joystick in different directions in response to prompt 50, with the level of detail/content within the selected part of the scene increasing further over time.

The process of the player character looking up again at the scene, to enable more detail to be added to selected parts of the sketch, may be repeated multiple times.

Thus, with reference now to FIG. 3K, during another pause in the sketching process, the character looks up again at the scene. An appropriate caption 52 may also be displayed, representative of the player character's thoughts at that moment, that may also provide a hint to the user as to what to do next. The user can then select a part of the field of view (in this example, the player character's brother 40 and the dog 42, again) that he or she wishes to be drawn in (even) more detail within the sketch, again responsive to on-screen caption 44 ("MOVE THE CAMERA WITH (R)") and by operating a joystick or pressing directional buttons on the user's game controller to change the player character's field of view. The user provides input (e.g. holding down the aforementioned control button "A") in response to caption 46, to cause the player character to observe the scene again. As shown in FIG. 3L, visual markers (in this example, solid lines) 54 may then be applied to the selected part of the field of view, to determine the features of the scene (the player character's brother 40 and the dog 42) that are to be sketched in more detail. As shown in FIGS. 3M, 3N, 3O and 3P, the sketching process then continues in the sketchbook 36, progressively piece-by-piece, with the level of detail/content within the selected part of the scene increasing further over time, responsive to the user moving the joystick in different directions in response to prompt 50. As shown in FIG. 3P, another textual caption 56, representing the thoughts of the player character at that moment, may also be displayed, as illustrated.

With reference now to FIG. 3Q, during yet another pause in the sketching process, the character looks up again at the scene. The user can then select other parts of the field of view that he or she wishes to be drawn in more detail within the sketch, e.g. by operating the joystick or pressing directional buttons on the user's game controller to direct the field of view towards the objects that the user wishes to be drawn in more detail. The user provides input (e.g. holding down the aforementioned control button "A"), in response to caption 46, to cause the player character to observe the scene again. As shown in FIG. 3R, visual markers (in this example, solid lines) 54 may then be applied to the selected parts of the field of view, to determine the features of the scene that are to be sketched in more detail. As shown in FIGS. 3S and 3T, the sketching process then continues in the sketchbook 36, progressively piece-by-piece, by the user moving the joystick in different directions in response to prompt 50, with the level of detail/content within the selected parts of the scene increasing further over time.

Finishing the Sketch

The user can terminate the overall sketching process at any time, e.g. by pressing a designated "LEAVE" button 38 (in the illustrated example, button "B") on their input device (hand-held game controller) 103, or by not reobserving the scene to add more detail. Alternatively, the overall sketching process may end when the sketch has been completed to a maximum possible extent—e.g. reaching a maximum available level of detail, after a maximum possible number of observations. In another alternative, the overall sketching process may end after a predetermined maximum length of time has been spent by the user in the sketching routine (the user is essentially timed-out), or in response to an event occurring within the game that interrupts the sketching or otherwise forces the player character to stop sketching.

At whichever point the user decides to terminate the sketching process, or the sketching process otherwise comes to an end, an animation may then be presented to show the user the finished sketch (i.e. the sketch as at the time the sketching process was terminated). In the example shown in FIGS. 3U and 3V, the screen 30 representing the player character's field of view zooms out from the sketchbook 36, to enable the user to see the finished sketch 58. The player character 32 then closes the sketchbook 36, as shown in FIG. 3W.

Storage, Retrieval, and Possible Sharing of the Finished Sketch or Video of the Sketch being Produced A static image of the finished sketch 58, or an animated video file showing the sketch being produced, may be stored via data storage means (e.g. 115/215 of FIG. 8 or 9) for subsequent retrieval. When operating a personal computer or video game console as in the scenario depicted in FIG. 1, the data storage means may comprise, for example, a hard disk or memory within or local to the control unit 14 of the user's video game apparatus 10, although it may alternatively comprise a remote network-based storage device in communication with the video game apparatus 10 via a network. On the other hand, when operating a network-based video game system as in FIG. 2, the data storage means may comprise a remote network-based storage device (e.g. in the server 22 or connected thereto), in communication with the user's terminal device 26 via network 24, or a local storage device within or local to the user's terminal device 26.

The user may subsequently retrieve and display (or print) the stored sketch image, or view the animated video file. Alternatively, or in addition, the user may share the stored sketch image or animated video file with others, e.g. by means of social media or other file sharing environments. In one implementation the game being played by the user, in which the sketch has been made, may allow the user to share the stored sketch image or animated video file with other players (or spectators) of the game, via a menu option within the game. Such sharing of sketch images or animated video files is particularly (but not exclusively) applicable to games being played using a network-based video game system as in FIG. 2.

Summary of Procedural Steps of the Sketching Routine

Figure 4:
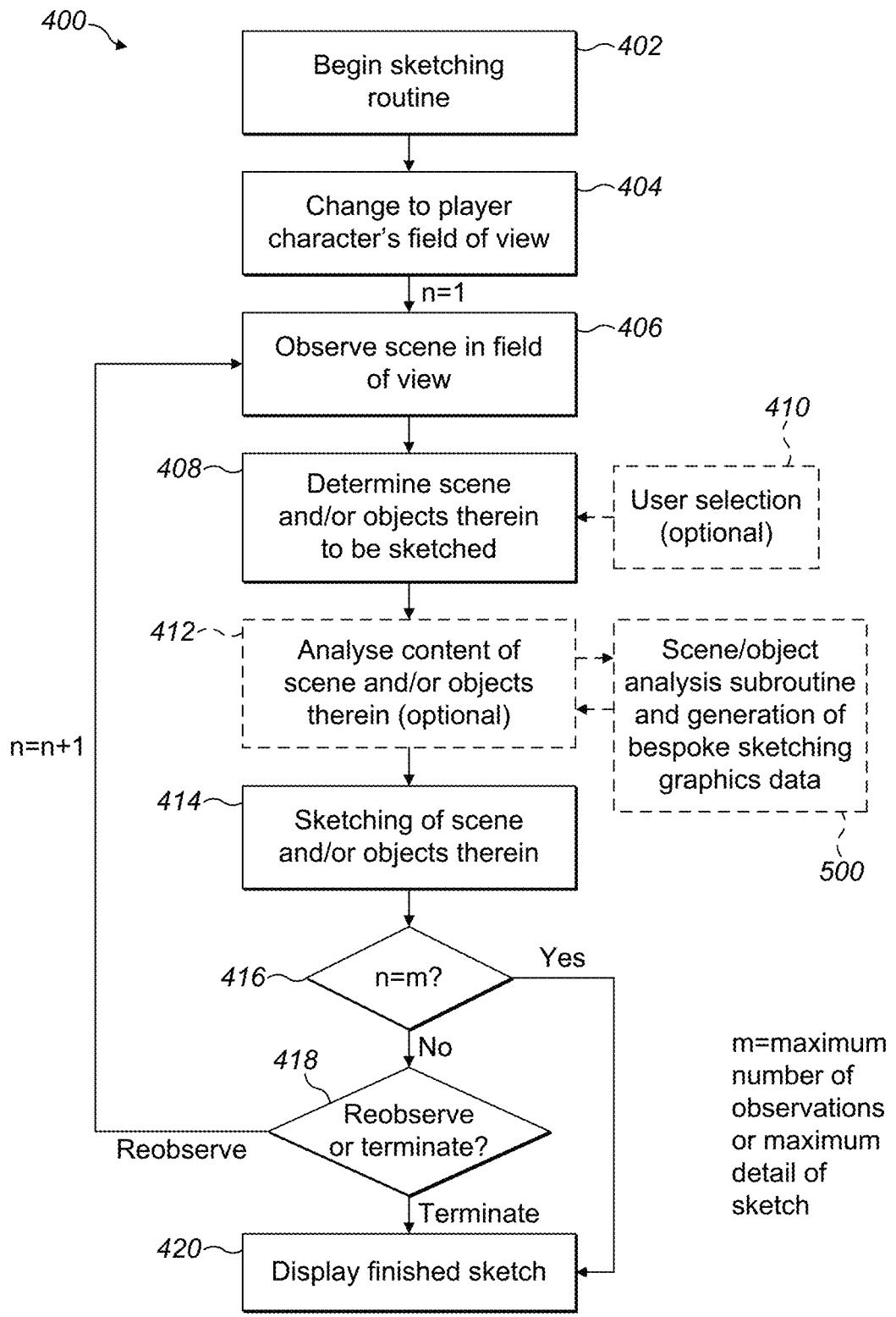
FIG. 4 is a procedural flow diagram of a sketching routine according to an embodiment of the invention, and showing optional steps that may be implemented in variants of the sketching routine.

As described above, and with reference now to the procedural flow diagram shown in FIG. 4, the sketching routine 400 (as executed by the processor 104/204 of FIG. 8 or 9) may include the following steps:

The sketching routine begins at step 402 (corresponding e.g. to FIG. 3A), and at step 404 the screen changes to show the player character's field of view (FIG. 3B) in a first-person manner.

At step 406 the player character observes the scene that is currently in the player character's field of view (FIG. 3C). The program may employ a counter in respect of the number of times, n, the scene is observed. For the first observation, n=1.

At step 408 the program determines the scene (and/or objects therein) that is to be sketched (FIG. 3D).

In the presently-preferred embodiments, the sketching routine proceeds directly from step 408 to step 414, in which the scene (and/or objects therein) is then sketched (FIGS. 3E and 3F). However, in alternative embodiments, optional steps 410, 412 and 500 may be employed, as described in greater detail below.

In step 416, a determination of the value of the counter n is made, to determine whether it is equal to a maximum number of observations (corresponding to a maximum level of detail in the sketch), m. If n is not equal to m, in step 418 the sketching routine enables the user to reobserve the scene. If the user chooses to reobserve the scene and thereby proceed with the sketching process, the value of the counter n is incremented by 1 (n=n+1) and the process is essentially repeated from step 406, i.e. by observing the scene that is currently in the player character's field of view (step 406), determining the scene (and/or objects therein) to be sketched (step 408), and sketching the scene (and/or objects therein) in step 414, in progressively greater levels of detail (FIGS. 3G-3T).

If, in step 416, n is equal to m (i.e. a maximum number of observations has been reached, corresponding to a maximum level of detail in the sketch), or if, in step 418, the user does not choose to reobserve the scene, the sketching routine then terminates the sketching process and in step 420 the finished sketch (as at the time the sketching process was terminated) is displayed.

At any point during the above steps 404-418, the user may leave the sketching routine by providing specific input to that effect (e.g. pressing the "B" button as described above). This causes the sketching routine to move directly to step 420 and to display the finished sketch as at the time the sketching process was terminated.

Implementational Details of Presently-Preferred Embodiments

In the presently-preferred embodiments as described above, the sketching process is entirely (or substantially entirely) scripted; it is not free-form and will not play out significantly differently each time. However, there are opportunities for variance, particularly depending on when the user chooses to stop sketching, or if they decide to complete as much detail as possible within the sketching event/gameplay.

In the presently-preferred embodiments the sketching process is scripted by a predetermined view in the game design. The user has to find a sketch location, and then activate the sketch activity by providing the applicable user input (e.g. function selection) to cause the sketching routine to begin. The player character will then typically be seated in a position in front of the sketch subject or view, and their field of view may be restricted to only limited adjustment by moving the virtual camera to highlight the predetermined sketchable elements.

In the presently-preferred embodiments, the sketching order is fixed: firstly to sketch the outline, and then to add other sketchable outlines or areas within the sketch. More tonal or line-drawn details can then be added, before exiting the sketch mode.

In the presently-preferred embodiments, the final sketch is a predetermined drawing created by an artist. The sketching process is a visual effect that reveals the drawing piece by piece, as if the player character were actually drawing.

In the presently-preferred embodiments, once the sketch has been finished, the user cannot then go back into the sketch process and re-engage with it, if they exited before the sketch is complete. Accordingly, however the user wishes, they can terminate the sketching process at an early stage, when the sketch is still relatively rough and unfinished, or at a later stage, when it contains more detail.

Alternative Embodiments

As discussed above, in the above-described embodiments the sketching process is not free-form and will not play out significantly differently each time, although variation in the finished sketch may be achieved by means of (i) the user being able to terminate the sketching process at any time; (ii) the user being able to vary the scene that is observed, by adjusting the direction in which the player character (virtual camera) is looking, and thereby determining which objects are to be sketched in greater detail; and (iii) the user being able to reobserve and readjust the direction in which the player character (virtual camera) is looking, and thereby add greater detail to other sketched objects, multiple times.

However, alternative embodiments provide a number of ways in which a more dynamic free-form sketching process may be executed, to result in bespoke sketches in respect of the player character's field of view. These alternative embodiments may include one or both of the following: (a) the user providing input during the sketching routine to select objects within the player character's field of view that are to be included in the sketch (or excluded from the sketch), or that are to be sketched in greater detail (see optional step 410 in FIG. 4); and/or (b) the user's video game apparatus 10 or terminal 26, or remote server 22, analysing the content of the scene in the player character's field of view, and/or objects within the scene, and determining how the sketch is to be created, which objects are to be included in the sketch, and what sketch texture (if any) is to be applied (see optional step 412 in FIG. 4 and subroutine 500 of FIG. 5, including the reference to optional sketching style settings 506 and optional sketch texture lookup table 510).

The above options (a) and (b) will now be described in greater detail.

(a) User Input During the Sketching Routine

During the sketching routine 400, as option 410 the user may be given the ability to select specific objects within the player character's field of view that are to be included in the sketch (or excluded from the sketch), or that are to be sketched in greater detail. This is essentially a development of the "observing" process described above with reference to on-screen captions 44 and 46. For example, when observing a scene, a plurality of objects within the observed scene may be identified using visual markers (e.g. dotted lines 48 as in FIGS. 3D and 3H). The user may then cycle between the identified objects (e.g. by pressing "up", "down", "left" or "right" buttons on their game controller, or by operating a joystick) to select (or deselect) certain ones of the identified objects to be sketched, or to be sketched in greater detail. The sketching routine will then include the selected objects in the sketching step 414, e.g. by incorporating pre-prepared sketches of each of the selected objects, from a database, into the sketch.

(b) Analysis of the Content of the Scene in the Player Character's Field of View, and/or Objects within the Scene, and Determining how the Sketch is to be Created, which Objects are to be Included in the Sketch, and What Sketch Texture (if any) is to be Applied With reference to optional step 412 in FIG. 4, the user's video game apparatus 10 or terminal 26, or remote server 22, may analyse the content of the scene in the player character's field of view, and/or objects within the scene, and determine how the sketch is to be created, which objects are to be included in the sketch, and what sketch texture (if any) is to be applied. This may essentially be implemented using a scene content analysing and sketch content determining unit 105/205 (see FIGS. 8 and 9), and may involve invoking a scene/object analysis subroutine as set out in FIG. 5, as follows:

After the scene/object analysis subroutine has begun (step 502), in step 504 the video game apparatus 10 or terminal 26, or remote server 22, may determine lines in respect of objects within the player character's field of view, for which lines corresponding sketch lines will subsequently be drawn in the sketch. The lines in respect of objects within the player character's field of view will generally include outlines of the objects within the field of view, but may also include constituent features within such objects.

In one example, the generation of such sketch lines may be done by analysing the rendering data (e.g. photorealistic rendering data) that is used to construct the scene that is displayed to the user, to determine the positions of the edges of the visible objects within the player character's field of view, and thence generate data defining corresponding sketch lines to be included in the sketch.

In another example, the generation of sketch lines may be done by performing a contrast analysis in respect of the visible objects within the player character's field of view, and generating data defining sketch lines corresponding to the lines in the field of view that have the greatest level of contrast, or that have a level of contrast above a predetermined threshold level.

In another example, each of the rendered objects displayed in the player character's field of view may have a sketch equivalent (e.g. a pencil line drawing equivalent) stored in a database, and data defining such sketch equivalents of the rendered objects may then be retrieved from the database to construct the sketch.

In yet another example, each of the objects in the player character's location in the game world may have a characteristic (virtual) point, for example a centre of gravity. If a characteristic point of a particular object is included in the field of view of the player character, the corresponding object will be depicted in the sketched scene. However, if a characteristic point of a particular object is not included in the field of view of the player character, the corresponding object will not be drawn.

In a further example, the sketch line texture that is applied when sketching an object may be varied dependent on the number of times the object is observed in the above-described "observing" process. For example, multiple line textures may be prepared for each of the objects, and a first line texture (e.g. a pencil-drawn line) is applied for the first observation. A second line texture (e.g. a painted line) would be applied for the second observation. Optionally, if the first texture (e.g. pencil-drawn) line has not already been drawn for an object, the second texture (e.g. painted) line would not be drawn, even if the object is included in the second observation.

Other ways of generating sketch lines corresponding to objects within the player character's field of view, essentially on an ab initio basis, may be apparent to those skilled in the art.

Sketching Style Settings

Figure 6:
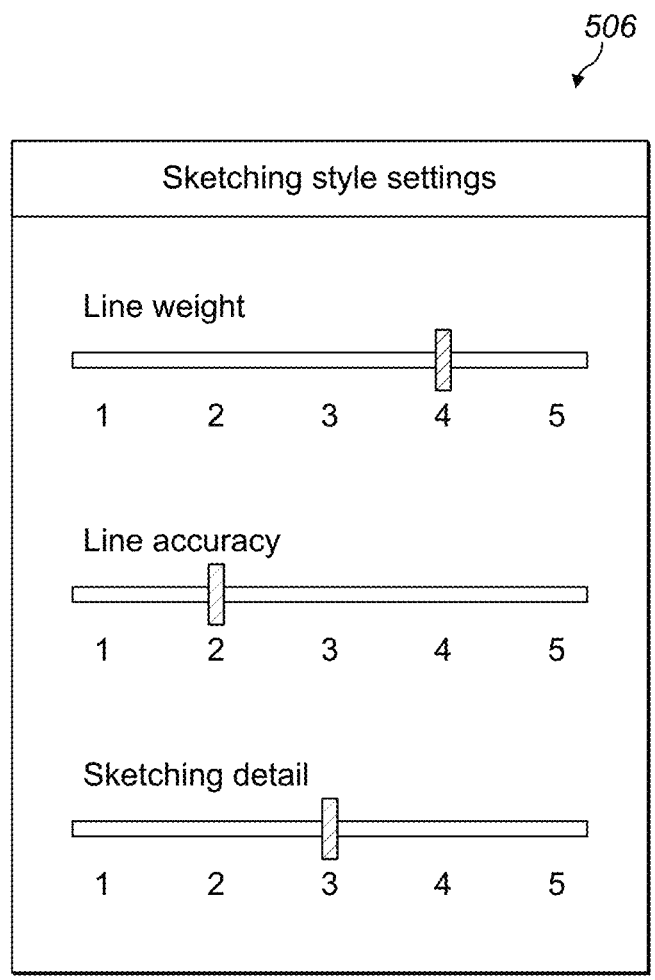
FIG. 6 is a schematic illustration of some exemplary sketching style settings to which the subroutine of FIG. 5 may refer.

Optionally, having generated data defining sketch lines corresponding to objects within the player character's field of view as outlined above, characteristics of the sketch lines may be further modified by applying one or more sketching style settings, as depicted schematically in FIG. 6. As illustrated, exemplary sketching style characteristics may include "line weight", "line accuracy" and "sketching detail". "Line weight" refers to whether the sketched lines are heavy (i.e. dark) or light. "Line accuracy" refers to whether the sketched lines are precisely drawn (high accuracy) or roughly drawn (low accuracy, e.g. by applying a random jitter function to the line). "Sketching detail" refers to whether the lines are relatively simple (e.g. single lines with a low level of detail) or relatively complex (e.g. multiple lines providing a high level of detail). As discussed below, lower levels of line accuracy and higher levels of sketching detail may be computationally more intensive and/or may cause greater amounts of sketching data to be transmitted across a network (in the case of a network-based game).

Other sketching style characteristics are also possible, such as "line texture" (e.g. pencil, ink or paint), "line colour" or "line thickness", for example.

In the illustrated example, each of the characteristics may take a value between 1 and 5, where 1 indicates a very light or low characteristic, 5 indicates a very heavy or high characteristic, and 2 to 4 represent intermediate levels. Naturally, as those skilled in the art will appreciate, other ranges of values (including simply "low" or "high" as binary settings) and other techniques (e.g. flags) may be used to quantify such characteristics.

The values of the sketching style characteristics may be set by the user through a menu or user interface, according to the user's personal preferences. FIG. 6 illustrates a possible graphical user interface for the sketching style settings 506 in which the value of each characteristic may be adjusted by the user using horizontal sliders. Other control elements or menu options may be provided for this purpose, as those skilled in the art will appreciate.

In an alternative embodiment, the values of the sketching style characteristics may be automatically set by the video game apparatus 10 or terminal 26, or remote server 22, essentially using a sketching style setting unit 113/213 (see FIGS. 8 and 9). In one particular case, the values of the sketching style characteristics may be set by the video game apparatus 10 or terminal 26, or remote server 22, dependent on an automatic evaluation of the processing capabilities of the video game apparatus 10 or terminal 26, or of the speed or latency of the network 24 between the terminal 26 and remote server 22 (especially in the case of streamed game content).

For example, if the video game apparatus 10 or terminal 26 has a relatively poor graphics processing capability, and/or if the network 24 is operating at a relatively low speed (e.g. due to congestion or high latency), the "line accuracy" characteristic may be set to a high level and/or the "sketching detail" characteristic may be set to a low level, to lessen the graphical processing burden on the video game apparatus 10 or terminal 26, and to reduce the amount of data that is being transmitted across the network 24.

On the other hand, if the video game apparatus 10 or terminal 26 has a relatively high graphics processing capability, and/or if the network 24 is operating at a relatively high speed (e.g. due to lack of congestion and low latency), the "line accuracy" characteristic may be set to a low level and/or the "sketching detail" characteristic may be set to a high level, as the video game apparatus 10 or terminal 26 is able to manage from a computational point of view, and the network 24 is able to cope with the increased amount of data that would be transmitted.

Application of Sketch Texture Effects

Figure 5:
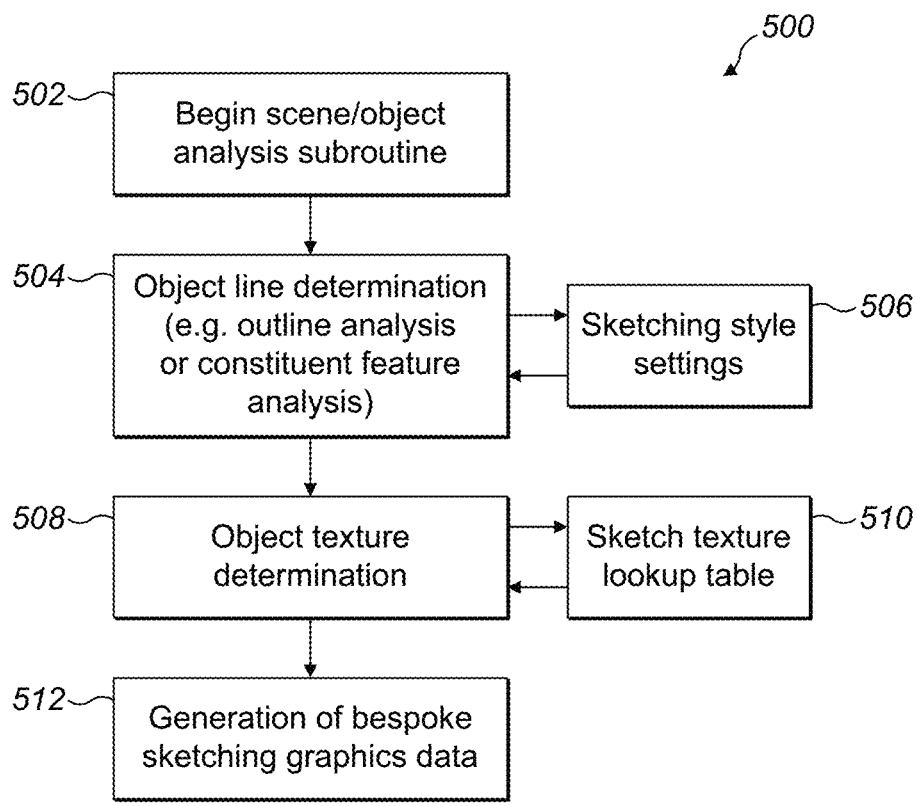
FIG. 5 is a procedural flow diagram of a scene/object analysis subroutine that may be invoked in a variant of the sketching routine of FIG. 4.

Returning back to the scene/object analysis subroutine 500 in FIG. 5, having determined (in step 504) sketch lines corresponding to objects (or constituent features thereof) within the player character's field of view, and having optionally altered the characteristics of the sketch lines as outlined above (step 506), one or more sketch texture effects may optionally be applied to the sketched objects in a step of object texture determination (step 508).

Thus, in the object texture determination step 508, the video game apparatus 10 or terminal 26, or remote server 22, may determine sketch texture effects to be applied to the sketched objects, essentially using a sketch texture determination unit 114/214 (see FIGS. 8 and 9). For example, cross-hatching may be applied to an object to indicate that it is made of fabric, or occasional short diagonal lines may be applied to indicate that the object has a shiny surface. This may be carried out though reference to a sketch texture lookup table 510, as shown schematically for example in FIG. 7.

The sketch texture lookup table essentially correlates a plurality of different video rendering effects (VR1-VR5) with corresponding sketch textures (ST1-ST5). The video rendering effects are those that may be applied (e.g. by a photorealistic graphics engine) to the surfaces of objects within the player character's field of view, according to rendering data, when generating the photorealistic (first-person) rendered output that is displayed to the user. In the example shown, VR1 causes the rendering of a shiny surface, VR2 causes the rendering of a fabric surface, VR3 causes the rendering of a metallic surface, VR4 causes the rendering of a wooden surface, and VR5 causes the rendering of a liquid surface. Through reference to the lookup table 510, for a given video rendering effect (VR1-VR5) that is applied to a given object in the player character's field of view, a corresponding predetermined sketch texture (ST1-ST5) can be retrieved and applied to the corresponding sketch of the object that is produced. Examples of the sketch textures ST1-ST5 are shown in the right hand column of the table 510.

Alternatively, each of the rendered objects displayed in the player character's field of view may have a corresponding predetermined sketch texture stored in a database, and such sketch textures may then be retrieved from the database to construct the sketch.

In the event that each of the rendered objects displayed in the player character's field of view has a pre-prepared sketch equivalent (e.g. a pencil line drawing equivalent) stored in a database, such sketch equivalents may also incorporate appropriate sketch texture.

Returning once more to the scene/object analysis subroutine 500 in FIG. 5, having determined (in step 504) sketch lines corresponding to objects (or constituent features thereof) within the player character's field of view, and having optionally altered the characteristics of the sketch lines (in step 506), and having optionally applied one or more sketch texture effects (in step 508), the video game apparatus 10 or terminal 26, or remote server 22, thereby generates (in step 512) bespoke sketching graphics data to be used in the sketching step 414 of the overall sketching routine 400.

Modifications and Alternatives

Detailed embodiments and some possible alternatives have been described above. As those skilled in the art will appreciate, a number of modifications and further alternatives can be made to the above embodiments whilst still benefiting from the inventions embodied therein. It will therefore be understood that the invention is not limited to the described embodiments and encompasses modifications apparent to those skilled in the art lying within the scope of the claims appended hereto.

What is claimed is:

1. A non-transitory computer-readable recording medium including a program executed by a computer apparatus to provide a video game that is progressed by controlling a character operated by a player, the character being in a three-dimensional virtual game world, the program causing the computer apparatus to function as:
    an image generator that carries out a sketching routine in the video game, wherein, in the sketching routine, the image generator generates images as a sketch of one or more features in the character's field of view;
    wherein the program further causes the computer apparatus to execute, in the sketching routine, an observing process in which input is received from the player via an input unit to cause the character to observe a scene in the character's field of view, as a precursor to sketching that particular scene; and
    wherein, in the sketching routine, the program further causes the computer apparatus to function as an analysing and determining unit, to analyse content of the scene in the character's field of view, and/or objects within the scene; to determine how the sketch is to be created and which objects are to be included in the sketch; and to generate data defining sketch lines to be included in the sketch.

2. The non-transitory computer-readable recording medium according to claim 1, wherein the program further causes the computer apparatus to function as:
    a processor that determines more content within the character's field of view that is to be added to the sketch over time.

3. The non-transitory computer-readable recording medium according to claim 1, wherein the program further causes the computer apparatus to function as:
    a processor that determines one or more features within the character's field of view that are to be sketched in greater detail based on input received from an input unit representative of a selection made by the player.

4. The non-transitory computer-readable recording medium according to claim 1, wherein the program further causes the image generator to apply visual markers within the character's field of view, to determine a subject-matter of the scene that is to be sketched.

5. The non-transitory computer-readable recording medium according to claim 1, wherein the program further causes the computer apparatus to repeat the observing process after the corresponding sketching has been done, to enable the player to add more content or greater detail to the sketch.

6. The non-transitory computer-readable recording medium according to claim 1, wherein the program further causes the computer apparatus to increase a level of detail included in the sketch in dependence on a length of time for which the character observes the scene.

7. The non-transitory computer-readable recording medium according to claim 1, wherein the sketching routine is partially scripted.

8. The non-transitory computer-readable recording medium according to claim 1, wherein each object in the character's location in the game world has a characteristic point, and the program further causes the analysing and determining unit to determine whether the characteristic point of each object is included in the character's field of view, and, if the characteristic point of an object is included in the character's field of view, to include the respective object in the sketch.

9. The non-transitory computer-readable recording medium according to claim 1, wherein the program further causes the analysing and determining unit to determine a sketch line texture to be applied when sketching an object.

10. The non-transitory computer-readable recording medium according to claim 9, wherein the program further causes the analysing and determining unit to vary the sketch line texture dependent on a number of times the object is observed in the observing process.

* * * * *